(12) United States Patent
Wulff et al.

(10) Patent No.: US 12,320,304 B2
(45) Date of Patent: Jun. 3, 2025

(54) GAS TURBINE ENGINE INCLUDING A COMPRESSOR BLEED AIR SYSTEM

(71) Applicant: General Electric Company, Schenectady, NY (US)

(72) Inventors: Meredith Wulff, North Reading, MA (US); Jonathan Atef Tawfik, Arlington, MA (US); Jesse Ollove, Tewksbury, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/452,205

(22) Filed: Aug. 18, 2023

(65) Prior Publication Data

US 2025/0059920 A1    Feb. 20, 2025

(51) Int. Cl.
*F02C 9/18* (2006.01)
*F04D 27/00* (2006.01)
*F04D 29/52* (2006.01)

(52) U.S. Cl.
CPC .............. *F02C 9/18* (2013.01); *F04D 27/009* (2013.01); *F04D 29/522* (2013.01)

(58) Field of Classification Search
CPC .............. F04D 27/023; F04D 27/0207; F04D 27/0215; F04D 27/009; F02C 6/08; F02C 9/18
See application file for complete search history.

(56) References Cited

U.S. PATENT DOCUMENTS

| | | | |
|---|---|---|---|
| 3,006,603 A | 10/1961 | Caruso et al. | |
| 5,340,274 A | 8/1994 | Cunha | |
| 9,726,084 B2 | 8/2017 | Duong et al. | |
| 9,810,157 B2 | 11/2017 | Nichols et al. | |
| 10,443,626 B2 | 10/2019 | Mielke et al. | |
| 10,451,083 B2 * | 10/2019 | Wilshaw | F02C 6/08 |
| 11,199,326 B2 | 12/2021 | Gringhaus et al. | |
| 11,230,936 B2 | 1/2022 | Lemaire | |
| 11,603,852 B2 | 3/2023 | Tawfik et al. | |

(Continued)

FOREIGN PATENT DOCUMENTS

GB         792343 A        3/1958

OTHER PUBLICATIONS

Phillips et al., U.S. Appl. No. 18/335,591, filed Jun. 15, 2023 [Available in IFW].

*Primary Examiner* — Thuyhang N Nguyen
(74) *Attorney, Agent, or Firm* — McCarter & English, LLP

(57) ABSTRACT

A gas turbine includes a compressor bleed air system that includes a compressor shroud, a compressor bleed air plenum, and a plurality of compressor bleed air passages arranged through the compressor shroud that provide fluid communication between the compressor airflow passage and the compressor bleed air plenum. The plurality of compressor bleed air passages are arranged circumferentially spaced apart from one another, where a first compressor bleed air passage and a second compressor bleed air passage circumferentially adjacent to one another are spaced apart a first angular spacing, and the respective inlets of at least a portion of a remainder of the plurality of compressor bleed air passages are circumferentially spaced apart from one another a second angular spacing, the second angular spacing being less than the first angular spacing.

18 Claims, 12 Drawing Sheets

(56) References Cited

U.S. PATENT DOCUMENTS

| | | | |
|---|---|---|---|
| 11,635,030 B2* | 4/2023 | Donnelly | F04D 29/522 60/785 |
| 12,006,879 B1* | 6/2024 | Nasir | F04D 29/542 |
| 2008/0101922 A1* | 5/2008 | Schirle | F02C 6/08 415/144 |
| 2019/0226488 A1* | 7/2019 | Tawfik | F04D 29/682 |
| 2021/0239320 A1 | 8/2021 | Alahyari et al. | |

* cited by examiner

GAS TURBINE ENGINE INCLUDING A COMPRESSOR BLEED AIR SYSTEM

GOVERNMENT LICENSE RIGHTS

This invention was made with Government Support under W58RGZ-19-C-0003 awarded by the Department of Defense. The Government has certain rights in the invention.

TECHNICAL FIELD

The present disclosure relates to a compressor bleed air system for a gas turbine.

BACKGROUND

A gas turbine engine generally includes a compressor that compresses an incoming airflow before the compressed airflow is provided to a combustor. In some gas turbines, a compressor bleed air system may be provided. The compressor bleed air system may include bleed air passages through a shroud of the compressor. A portion of the compressed airflow passing through the compressor may be bled out through the bleed air passages to a bleed air plenum. The air in the bleed air plenum may then be used for various other purposes, such as providing a cooling airflow to other portions of the gas turbine engine, or providing airflow for an aircraft environmental system.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth, or apparent from, a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," "fourth," "fifth," "sixth," etc., may be used to distinguish one component from another and are not intended to signify location or importance of the individual components.

A gas turbine engine installed on an aircraft generally includes a compressor that compresses an incoming airflow before the compressed airflow is provided to a combustor. In some gas turbines, a compressor bleed air system may be provided. The compressor bleed air system may include bleed air passages through a shroud of the compressor and a bleed air plenum. A portion of the compressed airflow passing through the compressor may be bled-out through the bleed air passages to the bleed air plenum. The air in the bleed air plenum may then be used for various other purposes, such as providing a cooling airflow to other portions of the gas turbine engine, or providing airflow for an aircraft environmental system on which the gas turbine engine is installed.

In a conventional bleed air system, the bleed air passages may be evenly spaced apart circumferentially about the compressor shroud. The airflow through the bleed air passages may induce a wake in an air stream that is felt as a pulse by a passing airfoil. A combination of the number of bleed air passages (pulses) and the rotational speed of the compressor creates a stimulus that may coincide with a natural frequency of compressor rotor blades. That is, the even circumferential spacing of the bleed air passages may result in repetitive frequencies about the compressor airflow passage, thereby introducing a stimulus on rotating hardware (e.g., compressor rotors) upstream of the bleed air passages and/or downstream of the bleed air passages. In the present disclosure, non-uniform spacing of the bleed air passages is provided so as to facilitate changing the frequency to reduce the vibration response induced in adjacent rotor blades. The changed frequency reduces the repetitive frequencies so as to reduce the vibration of the compressor rotor blades that may result in metal fatigue of the compressor rotor blades. In addition, reducing the repetitive frequency vibrations reduces effects that the vibrations have on other engine components.

Figure 1:
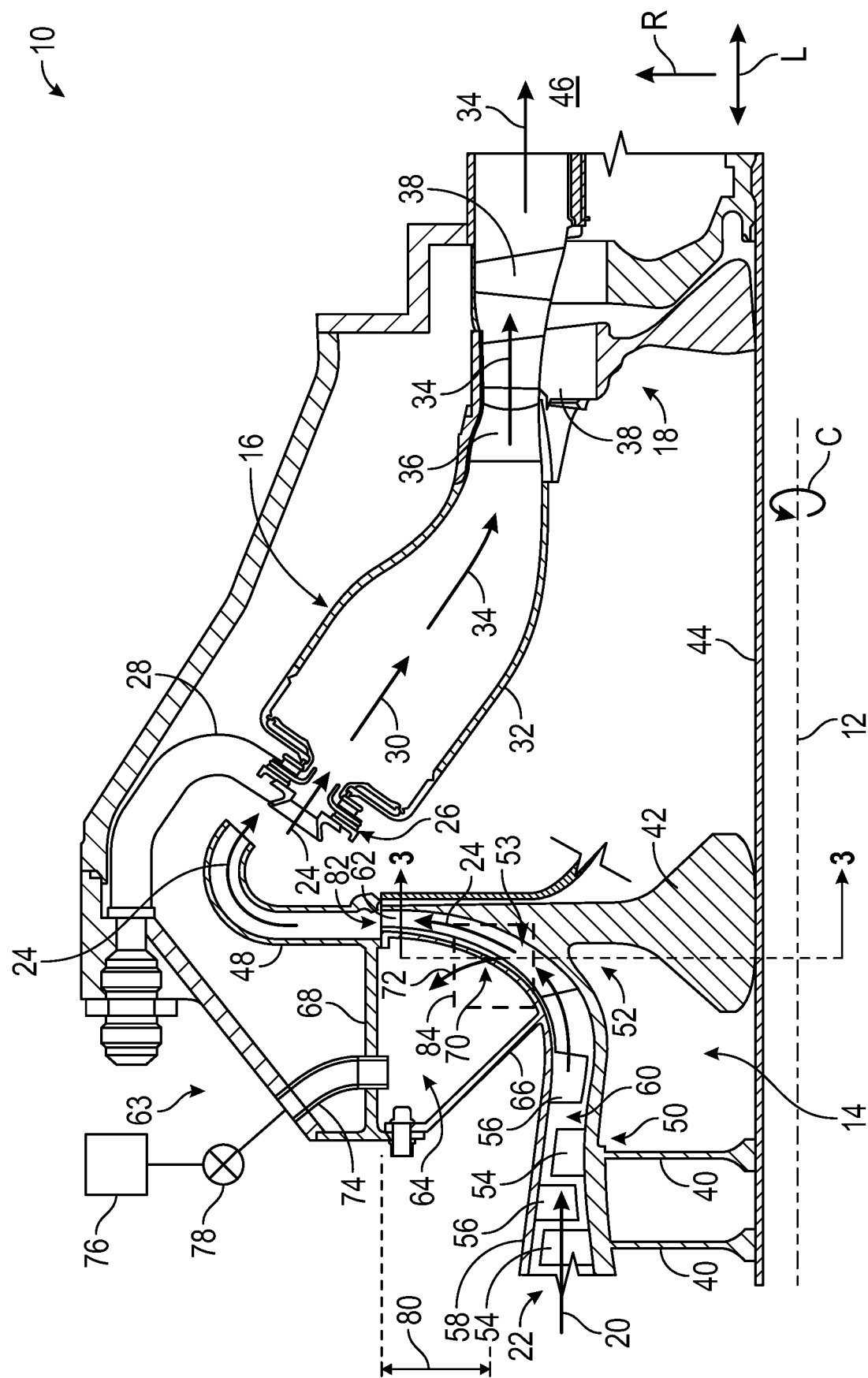
FIG. 1 is a partial cross-sectional view of a gas turbine engine, according to an aspect of the present disclosure.

Referring to the drawings, FIG. 1 is a partial cross-sectional view of a gas turbine engine 10, according to an aspect of the present disclosure. While FIG. 1 depicts one-half of the gas turbine engine 10, the gas turbine engine 10 generally extends circumferentially about a longitudinal centerline axis 12. The gas turbine engine 10 includes, in a sequential flow sequence, a compressor section 14, a combustion section 16, and a turbine section 18. As used herein, the terms "axial" and "longitudinal" both refer to a direction (L) parallel to the longitudinal centerline axis 12, while the term "radial" refers to a direction (R) perpendicular to or extending outwardly from the longitudinal centerline axis 12, and "tangential" or "circumferential" refers to a direction (C) extending about the longitudinal centerline axis 12. As used herein, the terms "forward" or "front" refer to a location relatively upstream in an air flow passing through or around a component, and the terms "aft" or "rear" refer to a location relatively downstream in an air flow passing through or around a component.

Generally, in operation of the gas turbine engine 10, inlet air 20, shown schematically via an arrow, enters an inlet end 22 of the compressor section 14, where the inlet air 20 is compressed by one or more compressor rotors 40 and an impeller 42 of the compressor section 14 to generate compressed air 24. The compressed air 24 is forced radially outward via the impeller 42 through a compressor outlet duct 48 such that the compressor section 14 may be referred to as a centrifugal flow compressor. While not shown in FIG. 1, the compressor outlet duct 48 may be in the form of a diffuser so at to decrease the flow velocity of the compressed air 24, while increasing the pressure of the compressed air 24 entering the combustion section 16. The compressed air 24 is provided from the compressor section 14 to the combustion section 16. A portion of the compressed air 24 flows through a swirler assembly 26 and is mixed with a fuel (not shown) provided by a fuel nozzle assembly 28 to form a fuel/air mixture 30. The fuel/air mixture 30 is ignited within a combustion chamber 32 to generate combustion gases 34 that are discharged to turbine section 18. The combustion gases 34 are expanded through a turbine nozzle 36 in the turbine section 18 and drive one or more turbine rotors 38, and then exit through an exhaust nozzle 46 (not shown, but merely numerically represented). The turbine rotors 38 may be connected to a shaft 44, which may also be connected to the compressor rotors 40 and the impeller 42, such that the driving of the turbine rotors 38 by the combustion gases 34 supports driving of the compressor rotors 40 and the impeller 42. The shaft 44 may also be connected to a propeller (not shown), either upstream of the compressor section 14 or downstream of the turbine section 18. Such a gas turbine engine 10 may, therefore, be a turboshaft engine. However, the principles described herein are equally applicable to any compressor. For example, they may apply to a compressor in a different configuration of a gas turbine engine, or to a compressor driven by an external prime mover.

The compressor section 14 includes an upstream portion 50 and a downstream portion 52. The upstream portion 50 of the compressor section 14 is configured for axial fluid flow and may also be referred to as an axial-flow portion or, simply, an axial portion. The upstream portion 50 includes a number of stages (two shown in FIG. 1). Each stage includes one of the compressor rotors 40, which includes a plurality of rotor vanes 54, and a circumferentially spaced row of stationary stator vanes 56 that are connected to a compressor shroud 58. The compressor shroud 58 extends circumferentially about the longitudinal centerline axis 12 (which may also therefore correspond to a centerline axis of the compressor shroud 58), and, therefore, the stator vanes 56 are spaced apart circumferentially about the compressor shroud 58 to form the row of stator vanes 56. The compressor shroud 58 also defines a compressor airflow passage 60 therewithin in which the inlet air 20 flows and is compressed. The compressor section 14 of FIG. 1 is merely one example of a compressor that may be implemented in a gas turbine engine, and the principles described herein are applicable to any type of compressor, including, as will be described in more detail below, a purely axial compressor.

The downstream portion 52 of the compressor section 14 is configured for centrifugal or mixed axial-centrifugal fluid flow and may be referred to as a centrifugal compressor airflow passage 53 or simply a centrifugal portion. The downstream portion 52 includes the impeller 42 mounted for rotation with the shaft 44. An annular array of airfoil-shaped impeller blades 62 extend outward from the impeller 42. The impeller blades 62 are configured in terms of their dimensions, cross-sectional shape, orientation, spacing, and other parameters (in accordance with conventional practice) to provide an incremental pressure increase to the compressed air 24 flowing past them as the impeller 42 rotates. The compressor shroud 58 extends radially outward and surrounds the impeller 42. A compressor bleed air system 63, which will be described in more detail below, is provided at the downstream portion 52 of the compressor section 14. The compressor bleed air system 63 may include a compressor bleed air plenum 64 that may be defined within a conical wall 66, a compressor casing 68, and the compressor shroud 58.

The compressor bleed air system 63 also includes a plurality of compressor bleed air passages 70 that extend through the compressor shroud 58 and provide fluid communication between the compressor airflow passage 60 and the compressor bleed air plenum 64. A portion of the compressed air 24 flowing through the compressor airflow passage 60 may pass through the compressor bleed air passages 70 as a compressor bleed airflow 72 into the compressor bleed air plenum 64. The compressor bleed air passages 70 may be positioned a distance 80 upstream from an exit end 82 of the impeller 42. The distance 80 along the compressor airflow passage 60 may vary depending upon the specific application based on pressure level requirements for the compressor bleed air plenum 64. These requirements are established based on knowledge of pressure level requirements for an aircraft system 76 and the losses in offtake pipes 74. The compressor bleed air passages 70 permit recovery of a portion of air velocity head from the inlet air 20 entering compressor section 14. The distance 80 is chosen such that the discharged pressure of the compressor bleed air passages 70 is at least a required static pressure level for the compressor bleed air plenum 64.

The compressor bleed air system 63 may further includes one or more offtake pipes 74 that provide the compressed bleed airflow 72 from the compressor bleed air plenum 64 to an engine or an aircraft system 76, shown schematically as a box, where it may be used for various purposes such as cooling, actuation, or environmental control. This flow may be controlled or modulated by appropriate equipment such as a valve 78, shown schematically.

Figure 2:
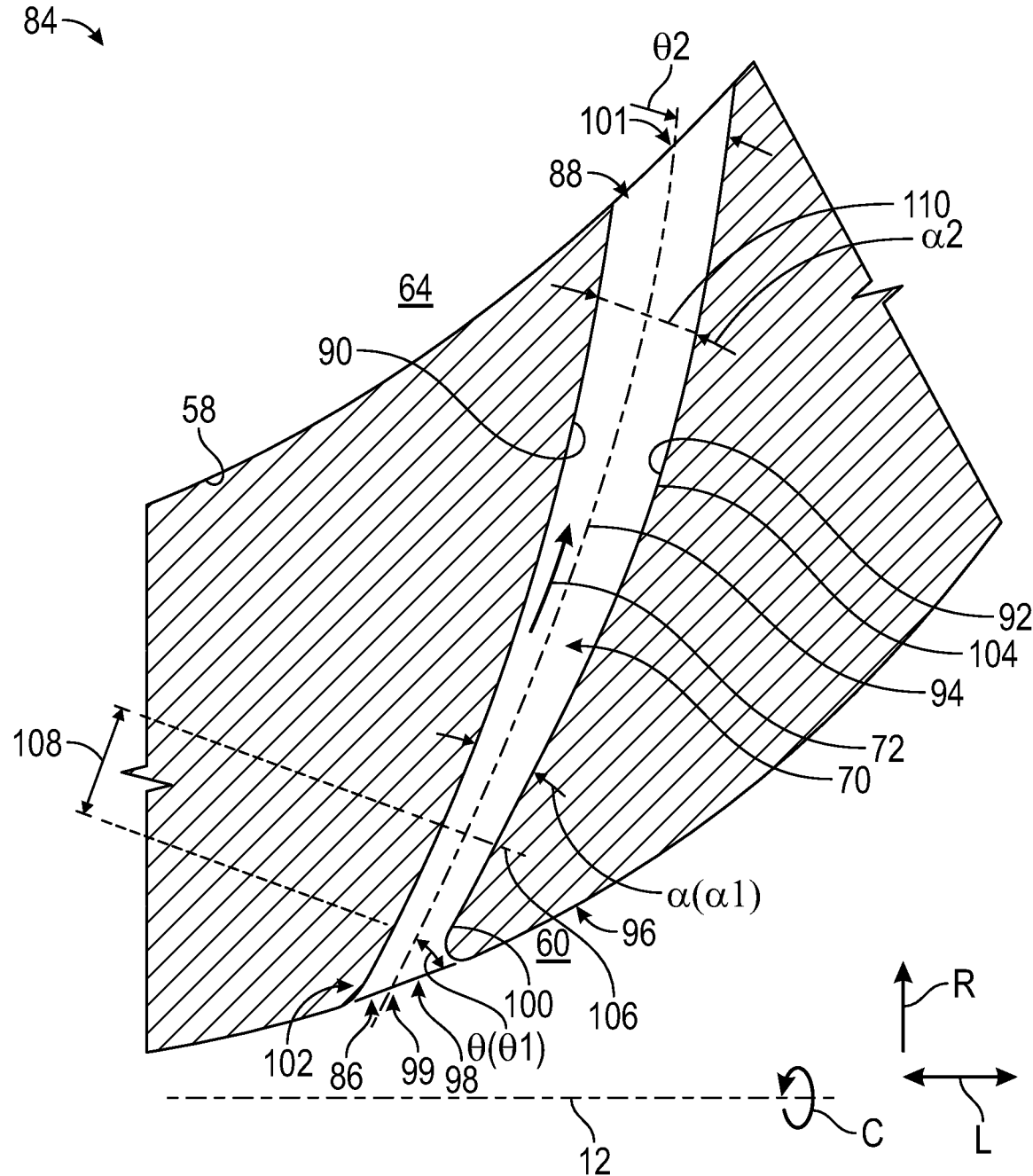
FIG. 2 is an enlarged view a compressor bleed air passage, taken at detail view 84 of FIG. 1, according to an aspect of the present disclosure.

FIG. 2 is an enlarged view of the compressor bleed air passage 70, taken at detail view 84 of FIG. 1, according to an aspect of the present disclosure. FIG. 2 depicts one compressor bleed air passage 70, but, in the compressor section 14, a plurality of the compressor bleed air passages 70 are arranged circumferentially spaced apart through the compressor shroud 58 about the longitudinal centerline axis 12. The circumferential spacing of the plurality of compressor bleed air passages 70 will be discussed in more detail below, but each of the plurality of compressor bleed air passages 70 may be configured as shown in FIG. 2.

In FIG. 2, the compressor bleed air passage 70 is seen to extend through the compressor shroud 58 from an inlet 86 at the compressor airflow passage 60 to an outlet 88 at the compressor bleed air plenum 64. The compressor bleed air passage 70 provides fluid communication between the compressor airflow passage 60 and the compressor bleed air plenum 64. In the longitudinal direction L, the compressor bleed air passage 70 may be defined between a forward sidewall 90 and an aft sidewall 92. The cross-sectional shape of the compressor bleed air passage 70 (e.g., taken across a plane 106) may be various shapes such as circular shaped, ellipsoid shaped, or polygon shaped. Therefore, the forward sidewall 90 and the aft sidewall 92 may comprise a plurality of spaced-apart surfaces, or they may comprise a single continuous wall surface extending around a closed periphery. A centerline 94 extends from an inlet center reference point 99 at the inlet 86 to an outlet center reference point 101 at the outlet 88. For any given axial location along the centerline 94 extending from the inlet 86 to the outlet 88, the centerline 94 passes through the centroid of the flow area of the compressor bleed air passage 70, at that axial location.

At the inlet 86, the centerline 94 is disposed at a nonparallel, non-perpendicular angle (designated generally as "θ") to an inner surface 96 of the compressor shroud 58. For reference purposes, the angle θ lies in an axial-radial plane (i.e., in a plane defined by the longitudinal direction L and the radial direction R), and is measured between a reference line 98 tangent to the inner surface 96 at the inlet 86 of the compressor shroud 58 and the centerline 94. For reference purposes, an axial location and a circumferential location of the inlet 86 may be defined by the inlet center reference point 99 that is defined at the intersection of the centerline 94 and the reference line 98. The angle θ1 at the inlet 86 may be referred as to an "offtake angle", while an angle θ2 may be referred to as an "outlet angle.". The value of the angle θ1 at the inlet 86 may be selected in accordance with conventional practices so as to extract or bleed air from the compressor airflow passage 60 at a desired flowrate and temperature condition while minimizing pressure losses. The value of θ2 may be selected based on a desired flowrate into the compressor bleed air plenum 64.

The compressor bleed air passage 70 includes a throat 100 at an upstream end 102 of the compressor bleed air passage 70, disposed immediately adjacent to and communicating with the inlet 86. The throat 100 may extend a distance 108 from an intersecting point of the reference line 98 and the centerline 94 to a plane 106 perpendicular to the centerline 94. Within the throat 100, the forward sidewall 90 and the aft sidewall 92 are parallel to each other such that the flow area between the forward sidewall 90 and the aft sidewall 92 along the length of the throat 100 is constant (i.e., the forward sidewall 90 and the aft sidewall 92 do not diverge).

The compressor bleed air passage 70 includes a diffuser flow passage 104 downstream of the throat 100 that extends along the centerline 94 from the plane 106 to the outlet 88. Within the diffuser flow passage 104, the forward sidewall 90 and the aft sidewall 92 diverge away from each other as they extend in the downstream direction from the plane 106 towards the outlet 88. Thus, the diffusion flow passage 104 has an increasing flow area between the forward sidewall 90 and the aft sidewall 92 from the plane 106 to the outlet 88. The increase in flow area causes flow diffusion to the compressor bleed airflow 72 passing through the compressor bleed air passage 70. The diffusion decreases the velocity of the compressor bleed airflow 72 through the compressor bleed air passage 70 and increases the static pressure, as the compressor bleed airflow 72 passes downstream through the diffuser flow passage 104 of the compressor bleed air passage 70. The rate of diffusion is related to a diffusion angle α between the forward sidewall 90 and the aft sidewall 92. For any given cross-sectional cutting plane 110 taken perpendicular to the centerline 94, the diffusion angle α is the angle between lines tangent to the forward sidewall 90 and the aft sidewall 92, and intersecting the cutting plane 110.

In order to provide an appropriate diffusion rate while minimizing pressure losses, the diffusion angle α may vary along the length of the compressor bleed air passage 70 (e.g., from α1 to α2. Stated another way, the forward sidewall 90 and the aft sidewall 92 can have a variable taper along their respective lengths rather than having a single straight taper. In the case when a variable taper is used, the diffuser flow passage 104 may include a plurality of discrete lengthwise segments (not shown) each having a constant diffusion angle α within that segment, or the diffusion angle α may change continuously within that segment. The diffusion angle α may be selected using appropriate design techniques for the particular application. For example, conventional computational fluid dynamics ("CFD") software or analytical methods may be used to model airflow through the compressor bleed air passage 70 so as to determine the appropriate diffusion angle α. In terms of reducing pressure losses, the diffusion angle α may have a relatively greater value (α1) upstream in the diffusion flow passage 104 or closer to the inlet 86, and may have a relatively lower value (α2) downstream in the diffusion flow passage 104 closer to the outlet 88. In other words, the diffusion angle α may have its maximum value directly downstream of the throat 100 and may gradually taper to lower values towards the outlet 88.

The flowpath of the compressor bleed air passage 70, as defined by the centerline 94, may, but need not, follow a straight line (e.g., a straight line in the radial direction R). Rather, all or a portion of the centerline 94 (and, accordingly, the forward sidewall 90 and the aft sidewall 92) may be curvilinear. The curvature may be used to reduce or to eliminate flow separation that may otherwise occur if the centerline 94 were straight instead of being curvilinear. For example, in a radial-axial plane (i.e., in a plane defined by the longitudinal direction L and the radial direction R), the centerline 94 is disposed at a first angle θ1 adjacent to the inlet 86, and is disposed at a second angle θ2 to the reference line 110, different from the first angle θ1, adjacent to the outlet 88. The second angle θ2 may be referred to as a "spouting angle". A radius and a direction of the curvature of the centerline 94 may be selected using appropriate design techniques for the particular application. For example, CFD software or analytical techniques may be used to model airflow through the compressor bleed air passage 70 to determine an appropriate radius and direction of the curvature of the centerline 94.

Figure 3:
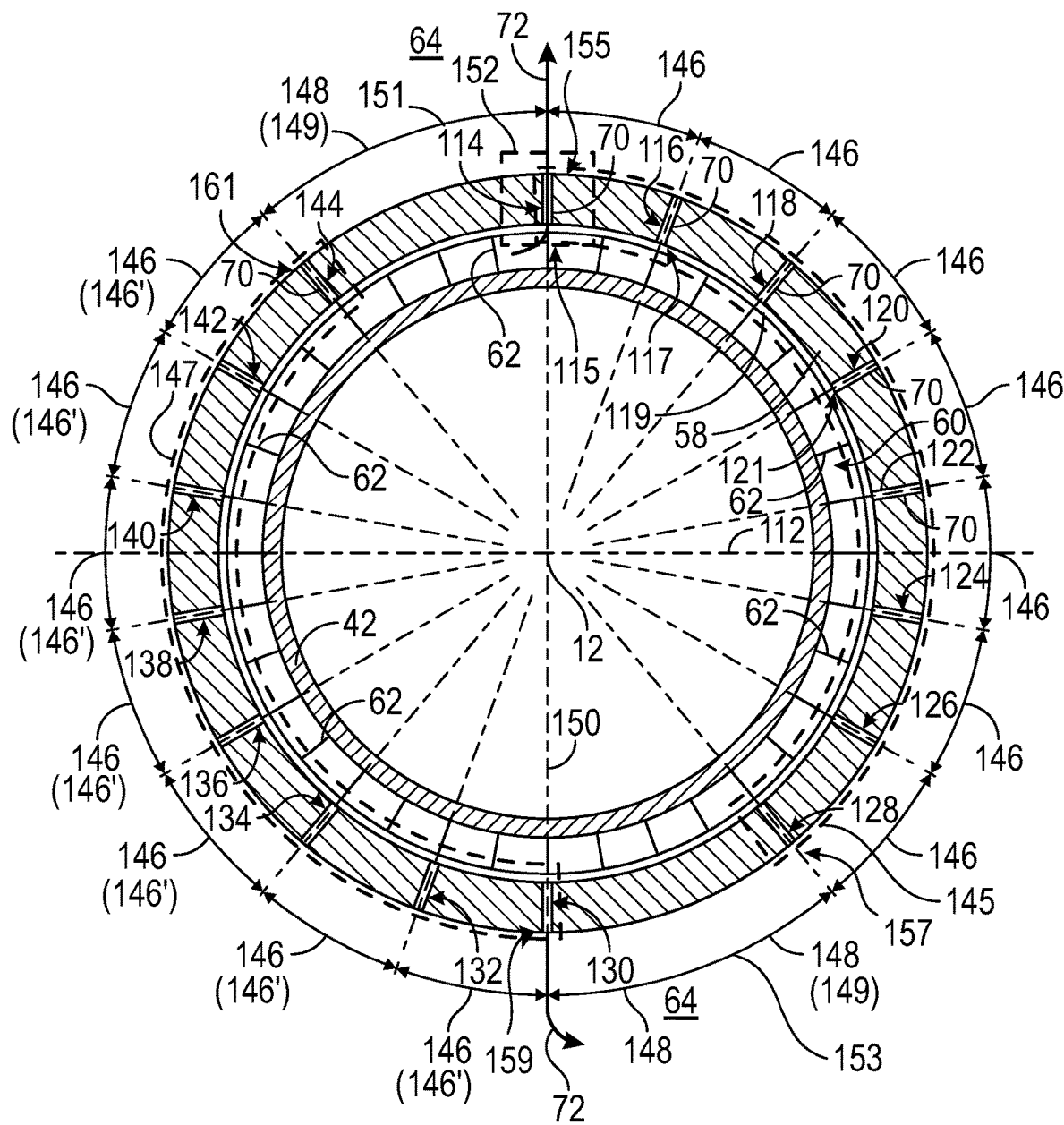
FIG. 3 is a partial cross-sectional view of a circumferential arrangement of the compressor bleed air passages through the compressor shroud, taken at plane 3-3 of FIG. 1, according to an aspect of the present disclosure.

FIG. 3 is a partial cross-sectional view of a circumferential arrangement of the compressor bleed air passages 70 through the compressor shroud 58, taken at plane 3-3 of FIG. 1, according to an aspect of the present disclosure. While FIG. 1 depicts a cross-sectional view of an upper half of the gas turbine engine 10 (upper half of the engine above a horizontal reference plane 112 through the longitudinal centerline axis 12), FIG. 3 includes an example of a lower half (e.g., a lower half of the engine below the horizontal reference plane 112 through the longitudinal centerline axis 12) of the compressor shroud 58 and impeller 42 (FIG. 1)

having the impeller blades 62, along with compressor bleed air passages 70 through the lower half of the compressor shroud 58. As was discussed above, the compressor shroud 58 extends circumferentially about the longitudinal centerline axis 12, and FIG. 3 includes the full circumferential depiction of the compressor shroud 58.

As shown in FIG. 3, the compressor shroud 58 includes a plurality of the compressor bleed air passages 70 therethrough that provide fluid communication between the compressor airflow passage 60 and the compressor bleed air plenum 64, such that the flow of the compressor bleed airflow 72 flows from an outer edge of the impeller blades 62 within the compressor airflow passage 60 to the compressor bleed air plenum 64. In FIG. 3, sixteen compressor bleed air passages 70 are shown circumferentially spaced apart about the longitudinal centerline axis 12. However, more than sixteen or fewer than sixteen compressor bleed air passages 70 may be included instead. The sixteen compressor bleed air passages 70 include a first compressor bleed air passage 114, a second compressor bleed air passage 116, a third compressor bleed air passage 118, a fourth compressor bleed air passage 120, a fifth compressor bleed air passage 122, a sixth compressor bleed air passage 124, a seventh compressor bleed air passage 126, an eighth compressor bleed air passage 128, a ninth compressor bleed air passage 130, a tenth compressor bleed air passage 132, an eleventh compressor bleed air passage 134, a twelfth compressor bleed air passage 136, a thirteenth compressor bleed air passage 138, a fourteenth compressor bleed air passage 140, a fifteenth compressor bleed air passage 142, and a sixteenth compressor bleed air passage 144. Each of the first compressor bleed air passage 114 through the sixteenth compressor bleed air passage 144 may have the configuration as shown in FIG. 2. As was discussed above with regard to the aspect of FIG. 2, a location of the inlet 86 of each of the compressor bleed air passage 70 is defined by the inlet center reference point 99 at the intersection of the centerline 94 and the reference line 98.

As shown in FIG. 3, each of the plurality of compressor bleed air passages 70 is circumferentially spaced apart from one another based on an angular spacing between respective ones of the inlet center reference point 99 of each of the plurality of compressor bleed air passages 70. Thus, a first inlet center reference point 115 defines a circumferential location for the first compressor bleed air passage 114. Similarly, a second inlet center reference point 117 defines a circumferential location for the second compressor bleed air passage 116. The circumferential spacing between the first compressor bleed air passage 114 and the second compressor bleed air passage 116 is defined by a first angular spacing 146. Similarly, a third inlet center reference point 119 defines a circumferential location of the third compressor bleed air passage 118, and the third compressor bleed air passage 118 is angularly spaced apart from the second compressor bleed air passage 116 by the first angular spacing 146. Likewise, the angular spacing between the third compressor bleed air passage 118 and the fourth compressor bleed air passage 120 may be the first angular spacing 146, and the angular spacing between the fourth compressor bleed air passage 120 and the fifth compressor bleed air passage 122 may be the first angular spacing 146. The angular spacing between the fifth compressor bleed air passage 122 and the sixth compressor bleed air passage 124 may be the first angular spacing 146, the angular spacing between the sixth compressor bleed air passage 124 and the seventh compressor bleed air passage 126 may be the first angular spacing 146, and the angular spacing between the seventh compressor bleed air passage 126 and the eighth compressor bleed air passage 128 may be the first angular spacing 146.

The same first angular spacing 146 may also be implemented between the ninth compressor bleed air passage 130 and the tenth compressor bleed air passage 132, between the tenth compressor bleed air passage 132 and the eleventh compressor bleed air passage 134, between the eleventh compressor bleed air passage 134 and the twelfth compressor bleed air passage 136, between the twelfth compressor bleed air passage 136 and the thirteenth compressor bleed air passage 138, and between the thirteenth compressor bleed air passage 138 and the fourteenth compressor bleed air passage 140. Likewise, the same first angular spacing 146 can be implemented between the fourteenth compressor bleed air passage 140 and the fifteenth compressor bleed air passage 142, and between the fifteenth compressor bleed air passage 142 and the sixteenth compressor bleed air passage 144.

On the other hand, a second angular spacing 148 is implemented between the first compressor bleed air passage 114 and the sixteenth compressor bleed air passage 144. The second angular spacing 148 may be, for example, two times greater than the first angular spacing 146. For example, when the first angular spacing 146 is twenty degrees, the second angular spacing is forty degrees. The same second angular spacing 148 may also be implemented between the eighth compressor bleed air passage 128 and the ninth compressor bleed air passage 130. Of course, the second angular spacing need not be two times greater than the first angular spacing 146, and any other ratio between the first angular spacing 146 and the second angular spacing 148 may be implemented, as long as that ratio is greater than 1:1. That is, the second angular spacing 148 and the first angular spacing 146 are different from one another, and, preferably, the second angular spacing 148 is greater than the first angular spacing 146.

Moreover, while FIG. 3 depicts a circumferential clocking arrangement where the first compressor bleed air passage 114 is arranged along a vertical reference plane 150, and the remaining compressor bleed air passages are arranged circumferentially with respect thereto, the circumferential clocking of the compressor bleed air passages 70 need not be as shown in FIG. 3. Rather, for example, the first compressor bleed air passage 114 may be circumferentially shifted to the position of the second compressor bleed air passage 116 instead, with each of the second compressor bleed air passage 116 through the sixteenth compressor bleed air passage 144 being circumferentially shifted clockwise by the same angular amount. With the foregoing circumferential spacing of the compressor bleed air passages 70, by virtue of providing the different (greater) second angular spacing 148 between at least two consecutively spaced compressor bleed air passages 70, the non-uniform spacing of the bleed air passages 70 facilitates changing the frequency of the airflow pulses against the compressor rotor blades to reduce the vibration response induced in the compressor rotor blades.

In FIG. 3, the plurality of compressor bleed air passages 70 may also be considered as being grouped into a plurality of groups. For example, a first group 145 of the compressor bleed air passages 70 may include the first compressor bleed air passage 114 through the eighth compressor bleed air passage 128, inclusive, and a second group 147 of the compressor bleed air passages 70 may include the ninth compressor bleed air passage 130 through the sixteenth compressor bleed air passage 144, inclusive. Within the first group 145 of the compressor bleed air passages 70, each of the compressor bleed air passages 70 is spaced apart an equal circumferential spacing, such as the first angular spacing 146. Similarly, within the second group 147 of the compressor bleed air passages 70, each of the compressor bleed air passages 70 are spaced apart an equal circumferential spacing, such as the first angular spacing 146. Thus, the first angular spacing 146 may be implemented in both the first group 145 and within the second group 147. Alternatively, within the second group 147, each of the compressor bleed air passages 70 may have different equal circumferential spacing than the equal circumferential spacing in the first group 145. For example, each of the compressor bleed air passages 70 within the second group 147 may be equally spaced apart with a first angular spacing 146' that is different from the first angular spacing 146 within the first group 145.

On the other hand, the first group 145 and the second group 147 are spaced apart from each other with an angular spacing that is greater than the first angular spacing 146. For example, the first group 145 and the second group 147 may be spaced apart by a second angular spacing 149, which may be the same as the second angular spacing 148. That is, for example, in the first group 145, the first compressor bleed air passage 114 may be considered to be at a first end 155 of the first group 145, and the eighth compressor bleed air passage 128 may be considered to be at a second end 157 of the first group 145. The ninth compressor bleed air passage 130 may be considered to be at a first end 159 of the second group 147, and the sixteenth compressor bleed air passage 144 may be at a second end 161 of the second group 147. The second angular spacing 149 between the first group 145 and the second group 147 is, for example, an angular spacing between the first end 155 of the first group 145 and the second end 161 of the second group 147 (i.e., the same as the second angular spacing 148 between the sixteenth compressor bleed air passage 144 and the first compressor bleed air passage 114), and an angular spacing between the second end 157 of the first group 145 and the first end 159 of the second group 147 (i.e., the same as the second angular spacing 148 between the eighth compressor bleed air passage 128 and the ninth compressor bleed air passage 130). In this case, the first group 145 and the second group 147 are considered to be a mirror image of one another in the FIG. 3 cross-sectional view, with equal first angular spacing 146 between the compressor bleed air passages 70 within each group, and with equal second angular spacing 149 between the first group 145 and the second group 147.

Alternatively, rather than adjacent ends of the first group 145 and the second group 147 being equally spaced apart by the second angular spacing 149, different angular spacings may be implemented between adjacent ends of the first group 145 and the second group 147. For example a second angular spacing 151 may be implemented between the first end 155 of the first group 145 and the second end 161 of the second group 147, where the second angular spacing 151 may be greater than the second angular spacing 149, and a third angular spacing 153 may be implemented between the second end 157 of the first group 145 and the first end 159 of the second group 147, where the third angular spacing 153 is less than the second circumferential spacing 151 and also less than the second angular spacing 149, but is greater than first angular spacing 146. In this case, the second group 147 may be shifted counterclockwise about the longitudinal centerline axis 12 from the location shown in FIG. 3 to provide a greater second angular spacing 151 than the second angular spacing 149, and to provide a lesser second angular spacing 153 than the second angular spacing 149.

With the foregoing first angular spacing 146 of the compressor bleed air passages 70 in each group, and the second angular spacing 148, the second angular spacing 149, the second angular spacing 151, or the third angular spacing 153, each of which is greater than the first angular spacing 146, between each group, the non-uniform spacing of the bleed air passages 70 facilitates changing the frequency of the airflow pulses against the compressor rotor blades to reduce the vibration response induced in the compressor rotor blades. Of course, the present disclosure is not limited to two groups (i.e., the first group 145 and the second group 147) of compressor bleed air passages 70, and more than two groups could be implemented instead, as long as the angular spacing between adjacent groups is different from the angular spacing between respective ones of the compressor bleed air passages 70 within the respective groups.

Figure 4:
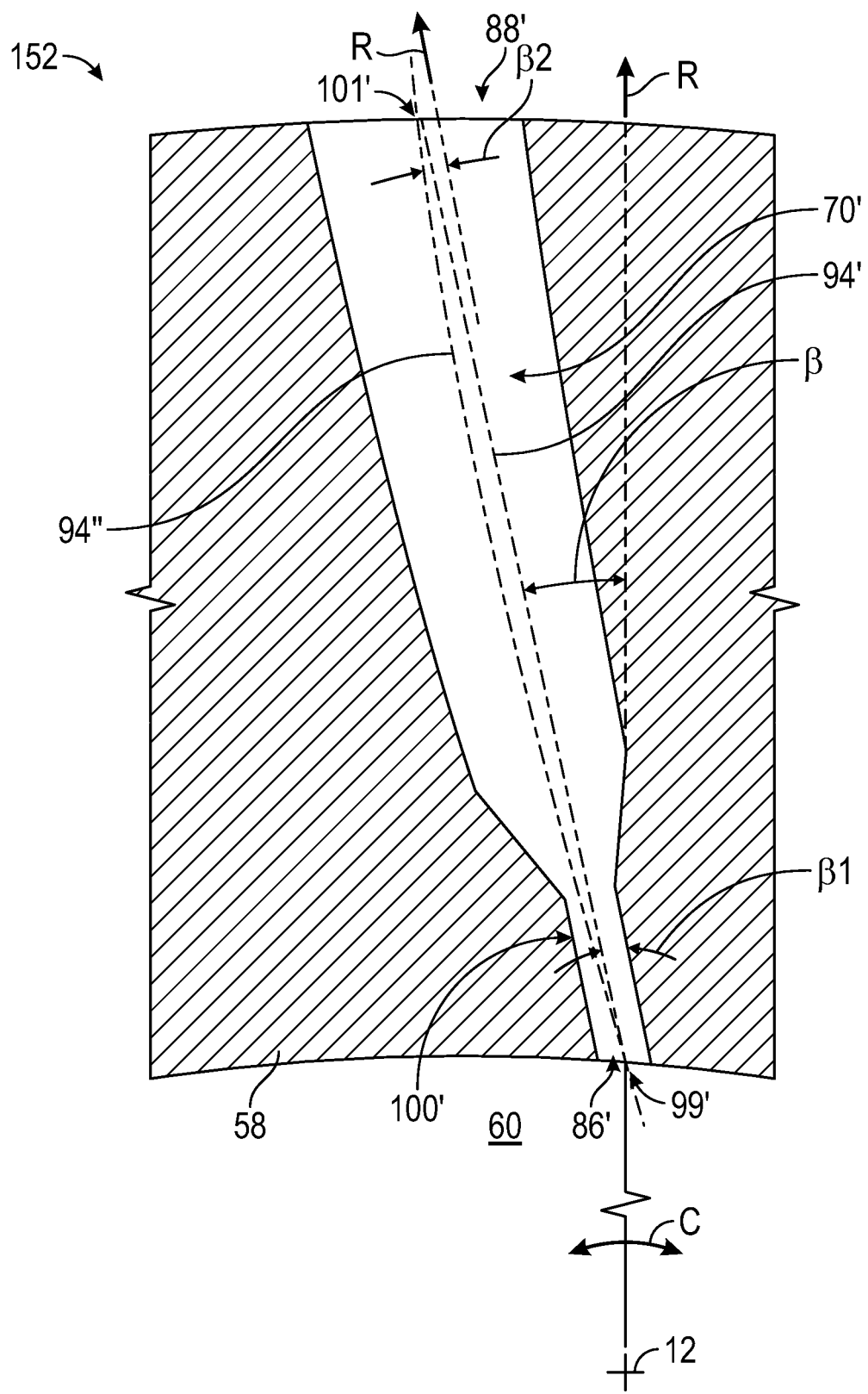
FIG. 4 is an enlarged view of a compressor bleed air passage, taken at detail view 152 of FIG. 3, according to an aspect of the present disclosure.

FIG. 4 is an enlarged view of a compressor bleed air passage 70, taken at detail view 152 of FIG. 3, according to an aspect of the present disclosure. In FIG. 4, a compressor bleed air passage 70' through the compressor shroud 58 is presumed to be a straight line passage in the radial direction R (i.e., extends in the radial direction R perpendicular to the longitudinal direction L in the radial-longitudinal R-L plane of FIG. 2) rather than being the curvilinear compressor bleed air passage 70 shown in FIG. 2. FIG. 4 depicts the compressor bleed air passage 70' having a throat 100' extending in the radial direction R and angled in the circumferential direction C with respect to the longitudinal centerline axis 12. For example, in FIG. 4, a centerline 94' is shown as being angled in the circumferential direction C at an angle β relative to the radial direction R. Alternatively, a curved centerline 94" that is curved similar to the centerline 94 (FIG. 2) when viewed in a radial-tangential plane may be implemented. In the example shown in FIG. 4, the centerline 94' extends from the inlet center reference point 99' to the outlet center reference point 101', and is disposed at a first angle β1 (i.e., a tangential component of the offtake angle described above) adjacent an inlet 86', and is disposed at a second angle β2 (i.e., a tangential component of the spouting angle described above), different from the first angle β1, at an outlet 88'. Thus, both the offtake angle and the spouting angles may be three-dimensional parameters. The angles and the curvature may be configured to provide a low resultant offtake angle at the off-take intersection with the compressor airflow passage 60, then approaching a functionally optimal spouting angle in three dimensions, which results in a low swirl exiting flow or a zero swirl exiting flow.

Figure 5:
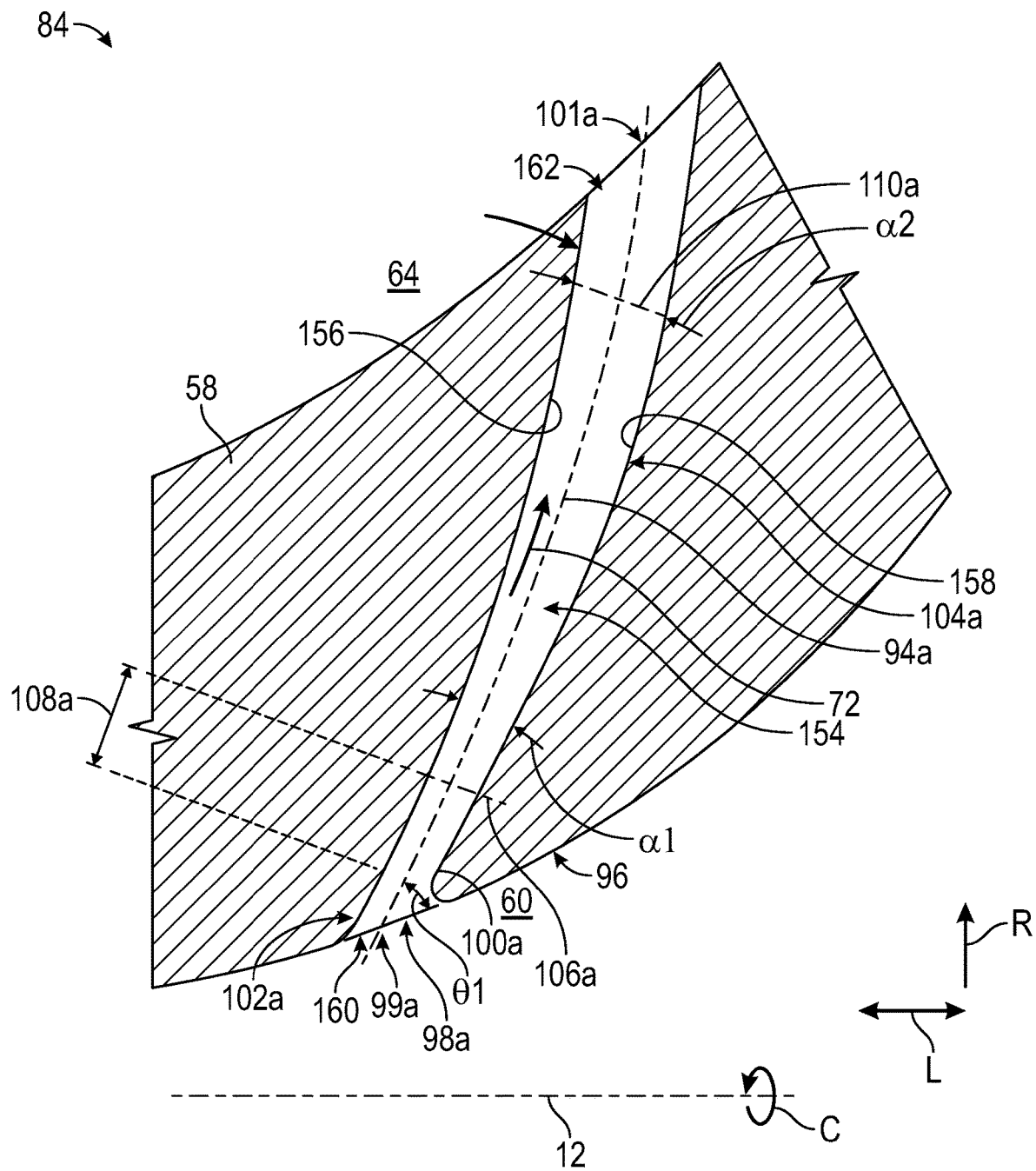
FIG. 5 depicts an alternate arrangement of a compressor bleed air passage to that shown in FIG. 2, according to an aspect of the present disclosure.

FIG. 5 depicts an alternate arrangement of a compressor bleed air passage to that shown in FIG. 2, according to an aspect of the present disclosure. In the FIG. 5 aspect, in the side view depicted therein, an annular slot compressor bleed air passage 154 is depicted, and is configured substantially the same as the compressor bleed air passage 70 of FIG. 2, with one difference being that the annular slot compressor bleed air passage 154 is configured as an annular slot extending partially or wholly around the central longitudinal axis 12. The annular slot compressor bleed air passage 154 is defined between a forward sidewall 156 of the compressor shroud 58 and an aft sidewall 158 of the compressor shroud 58. Similar to the compressor bleed air passage 70 of the FIG. 2 aspect, the annular slot compressor bleed air passage 154 extends from an inlet 160 at the compressor airflow passage 60 to an outlet 162 at the compressor bleed air plenum 64. Other elements depicted in FIG. 5 for the annular slot compressor bleed air passage 154 are the same as those depicted in the FIG. 2 aspect, but include an "a" designation.

Those same elements include a centerline 94a, a reference plane 98a, an inlet center reference point 99a, an outlet center 101a, a throat 100a, an upstream end 102a, a diffuser flow passage 104a, a plane 106a, a distance 108a, and a cutting plane 110a. The description of the same elements in FIG. 5 having the "a" designation is the same as the corresponding elements in FIG. 2 without the "a" designation and the description of those same elements is not repeated herein.

Figure 6:
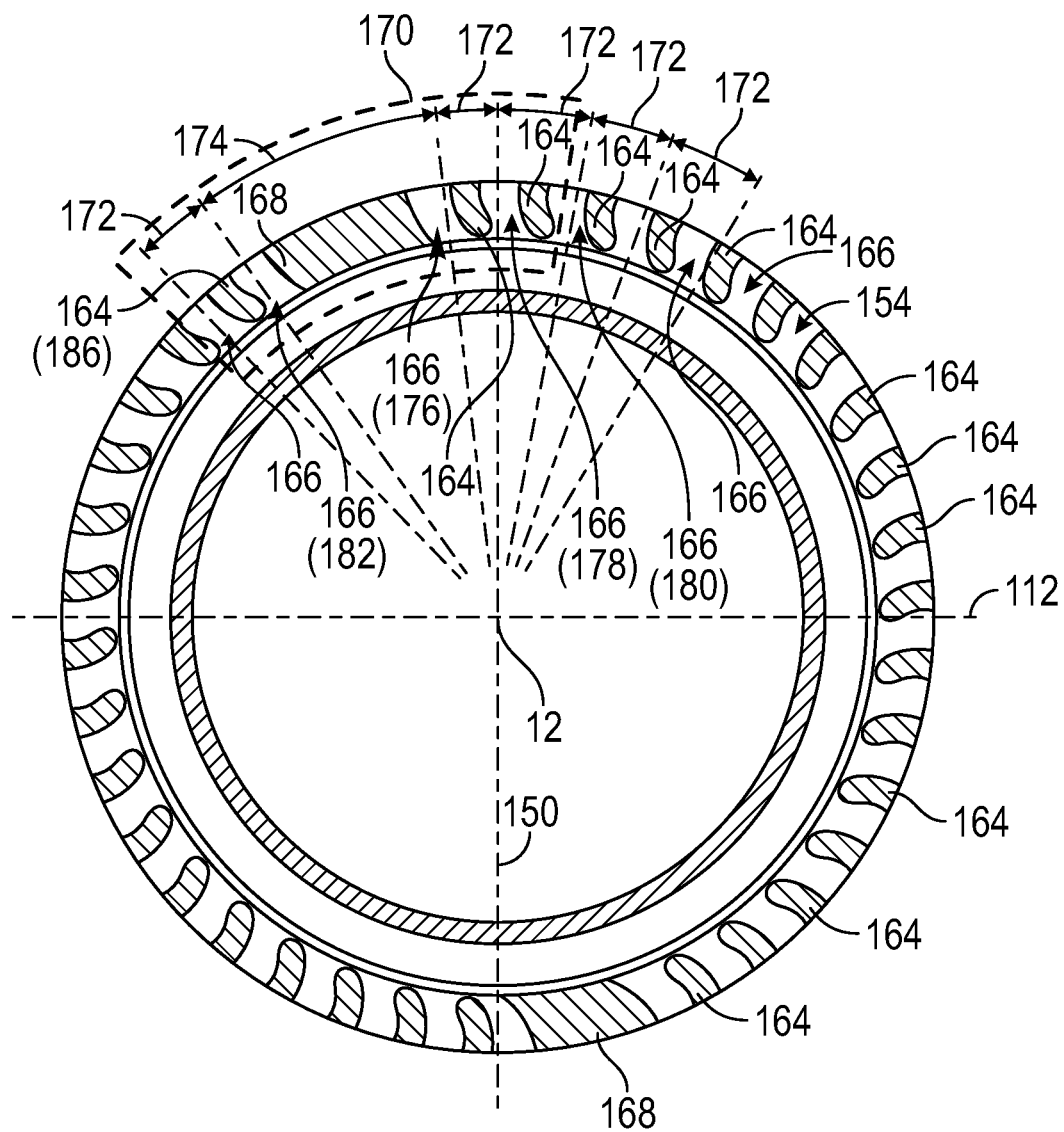
FIG. 6 is an alternate partial cross-sectional view to that of FIG. 3 of the alternate compressor bleed air passages, according to an aspect of the present disclosure.
Figure 7:
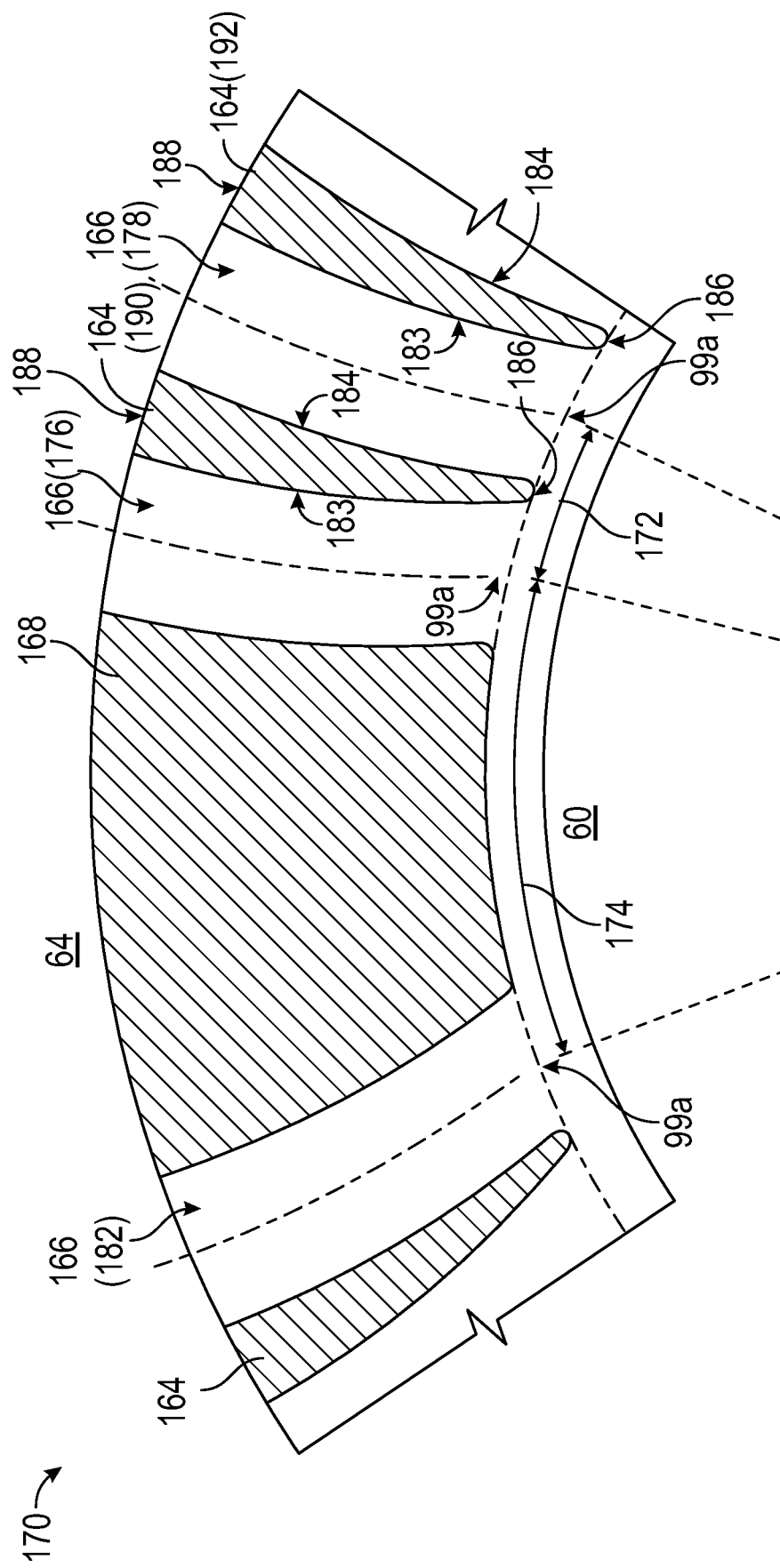
FIG. 7 is an enlarged view of a portion of FIG. 6, taken at detail view 170 of FIG. 6, according to an aspect of the present disclosure.

FIG. 6 is an alternate cross-sectional view to that shown in FIG. 3, depicting the alternate annular slot compressor bleed air passage 154 of FIG. 5, according to an aspect of the present disclosure. FIG. 7 is an enlarged view of a portion of FIG. 6, taken at detail view 170. Referring collectively to FIG. 6 and FIG. 7, the annular slot compressor bleed air passage 154 may be divided circumferentially into a plurality of compressor bleed air passages 166 by including a plurality of vanes 164 within the annular slot compressor bleed air passage 154. As will be described below, each of the plurality of vanes 164 may have the same shape and may be spaced apart from one another a same amount so that each of the plurality of compressor bleed air passages 166 also have the same shape.

The configuration of FIG. 6 also includes at least one large vane 168 that extends in the circumferential direction across a greater circumferential span than each of the vanes 164. Each of the vanes 164 and the at least one large vane 168 extend, in the axial direction L (FIG. 5), between the forward sidewall 156 and the aft sidewall 158. The plurality of compressor bleed air passages 166 are circumferentially spaced apart from one another by a first angular spacing 172. For example, a first compressor bleed air passage 176 and a second compressor bleed air passage 178 are spaced apart from one another by the first angular spacing 172. The first angular spacing 172 is due to the inclusion of the vane 164 being arranged between the first compressor bleed air passage 176 and the second compressor bleed air passage 178. Similarly, the second compressor bleed air passage 178 and a third compressor bleed air passage 180 are circumferentially spaced apart from one another by the first angular spacing 172. Again, the first angular spacing 172 is due to the inclusion of the vane 164 being arranged between the second compressor bleed air passage 178 and the third compressor bleed air passage 180. Thus, in the case when the vane 164 is provided to define the compressor bleed air passages 166, the spacing between those adjacent compressor bleed air passages 166 is the first angular spacing 172.

On the other hand, a fourth compressor bleed air passage 182 and the first compressor bleed air passage 176 are circumferentially spaced apart from one another a second angular spacing 174, which is greater than the first angular spacing 172. The second angular spacing 174 is due to the inclusion of the large vane 168 being arranged between the first compressor bleed air passage 176 and the fourth compressor bleed air passage 182.

As shown in FIG. 7, the vanes 164 may have a shape defined by a perimeter having a first side 183, a second side 184, an inner end 186 and an outer end 188. The first side 183 and the second side 184 may have a curved shape. The shape of the compressor bleed air passages 166 is defined by the shape of adjacent vanes 164. For example, the shape of the second compressor bleed air passage 178, which is arranged between a first vane 190 and a second vane 192, is defined by the shape of the second side 184 of the first vane 190 and the first side 183 of the second vane 192. In the case when the shape of each of the vanes 164 is the same, and the first angular spacing 172 between the vanes 164 is the same, the shape of the compressor bleed air passages 166 is also the same. As with the FIG. 3 aspect, the circumferential spacing of the compressor bleed air passages 166 in FIG. 7 is taken at the inlet center reference point 99a and the longitudinal centerline axis 12.

Figure 8:
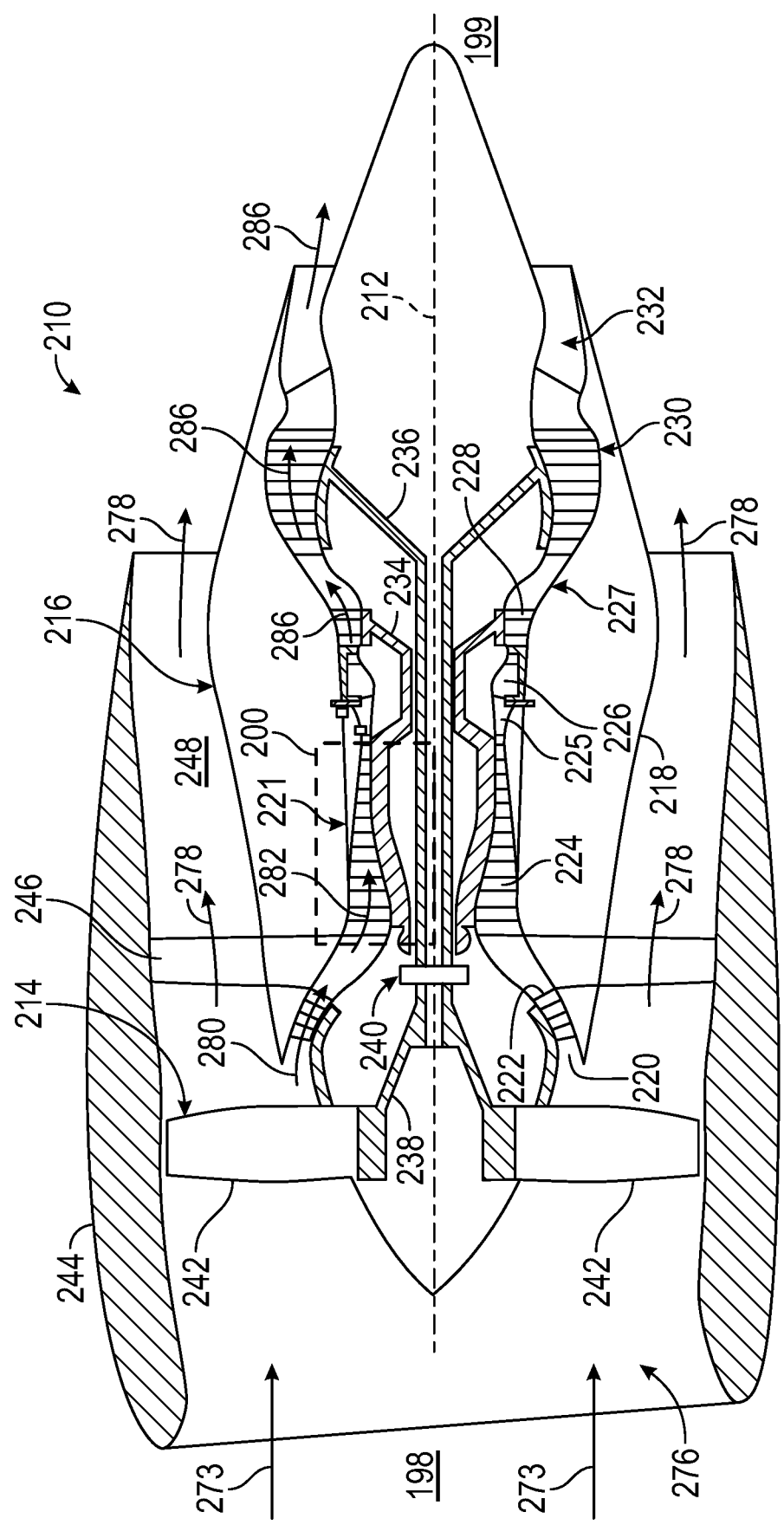
FIG. 8 is a schematic partial cross-sectional view of an exemplary high by-pass turbofan jet engine, according to an aspect of the present disclosure.

The foregoing description of FIG. 1 through FIG. 7 relates to the centrifugal flow compressor section 14 as shown in FIG. 1, but the present disclosure regarding the compressor bleed air passages can also be implemented in an axial flow compressor arrangement of a gas turbine engine. FIG. 8 is a schematic partial cross-sectional view of an exemplary high by-pass gas turbine engine 210 (also referred to herein as "engine 210"), according to an aspect of the present disclosure. Although further described below with reference to a high by-pass turbine engine, the present disclosure is also applicable to turbomachinery in general, including turbojet, turboprop, and turboshaft gas turbine engines, including marine-based turbine engines, industrial turbine engines, and auxiliary power units. As shown in FIG. 8, the engine 210 has a longitudinal centerline axis 212 that extends therethrough from an upstream end 198 to a downstream end 199 for reference purposes. In general, the engine 210 may include a fan assembly 214 and a core engine 216 disposed downstream from the fan assembly 214.

The core engine 216 may generally include an outer casing 218 that defines an annular inlet 220. The outer casing 218 encases, or at least partially forms, in serial flow relationship, a compressor section 221 having a low pressure (LP) compressor 222 and a high pressure (HP) compressor 224, a diffuser 225, a combustion section 226, a turbine section 227 including a high pressure (HP) turbine 228 and a low pressure (LP) turbine 230, and a jet exhaust nozzle section 232. A high pressure (HP) rotor shaft 234 drivingly connects the HP turbine 228 to the HP compressor 224. A low pressure (LP) rotor shaft 236 drivingly connects the LP turbine 230 to the LP compressor 222. The LP rotor shaft 236 may also be connected to a fan shaft 238 of the fan assembly 214. In particular embodiments, as shown in FIG. 8, the LP rotor shaft 236 may be connected to the fan shaft 238 by way of a reduction gearbox 240, such as in an indirect-drive configuration or a geared-drive configuration.

As shown in FIG. 8, the fan assembly 214 includes a plurality of fan blades 242 that are coupled to, and that extend radially outwardly from, the fan shaft 238. An annular fan casing or a nacelle 244 circumferentially surrounds the fan assembly 214 and/or at least a portion of the core engine 216. The nacelle 244 may be supported relative to the core engine 216 by a plurality of circumferentially spaced outlet guide vanes or struts 246. Moreover, at least a portion of the nacelle 244 may extend over an outer portion of the core engine 216 so as to define a bypass airflow passage 248 therebetween.

During operation of the engine 210, a volume of air 273, as indicated schematically by arrows, enters the engine 210 from the upstream end 198 through an associated nacelle inlet 276 of the nacelle 244 and/or the fan assembly 214. As the air 273 passes across the fan blades 242, a portion of the air 273 is directed or routed into the bypass airflow passage 248 as a bypass airflow 278, while another portion of the air 273 is directed or routed into the LP compressor 222 via the annular inlet 220 as a compressor inlet air 280. The compressor inlet air 280 is progressively compressed to generate compressed air 282 as it flows from the annular inlet 220 through the LP compressor 222 and the HP compressor 224 towards the combustion section 226. The compressed air 282 flows through the diffuser 225 and into the combustion section 226, where the compressed air 282 is mixed with fuel to generate an air/fuel mixture that is ignited and burned to generate combustion gases 286. The combustion gases 286 flow into the HP turbine 228, thus causing the HP rotor shaft 234 to rotate, thereby supporting operation of the HP compressor 224. The combustion gases 286 are then routed through the LP turbine 230, thus causing the LP rotor shaft 236 to rotate, thereby supporting operation of the LP compressor 222 and/or rotation of the fan shaft 238. The combustion gases 286 are then exhausted through the jet exhaust nozzle section 232 of the core engine 216 to provide propulsion at the downstream end 199.

Figure 9:
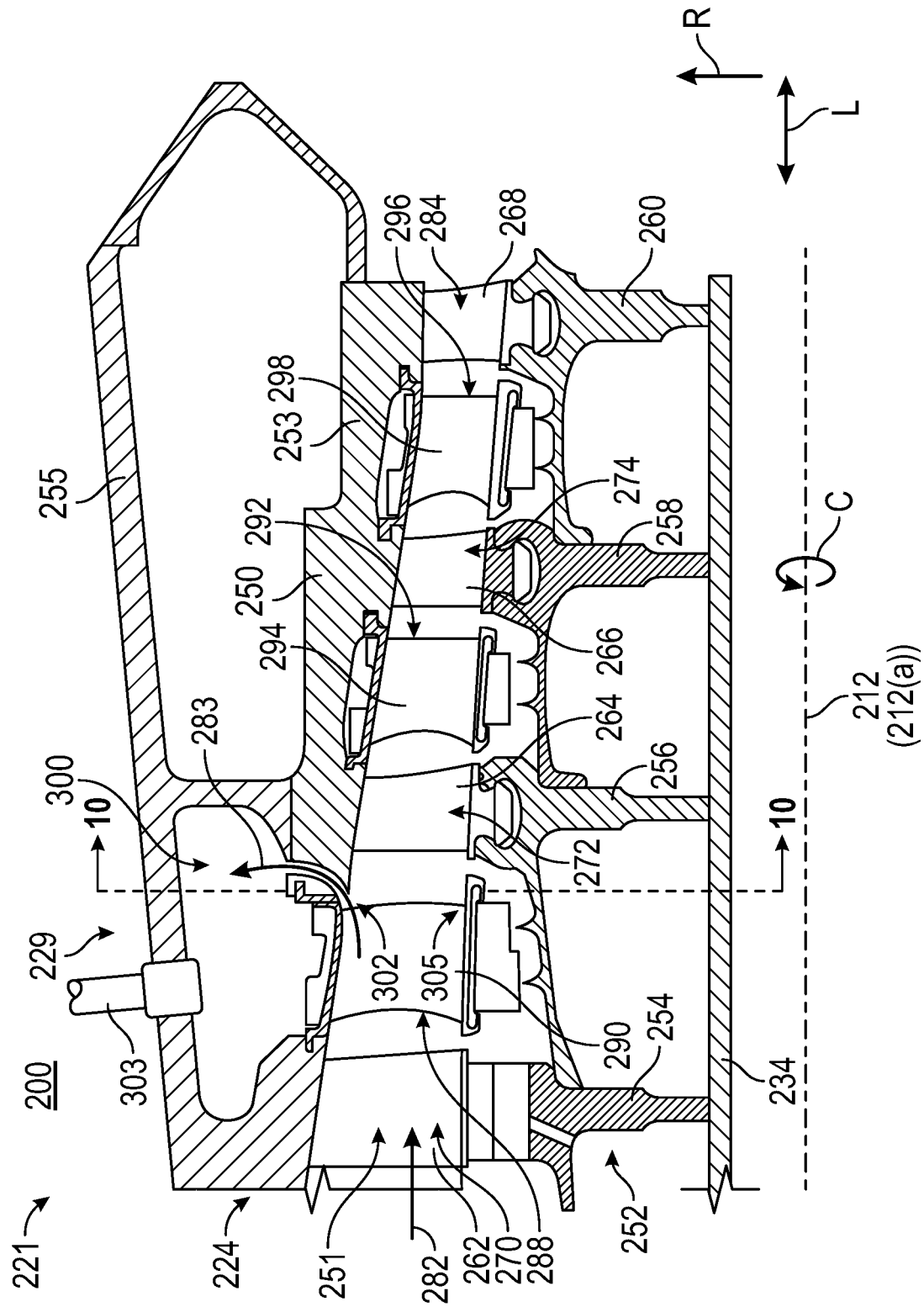
FIG. 9 is a partial cross-sectional view of an exemplary portion of a high pressure compressor, taken at detail view 200 of FIG. 8, according to an aspect of the present disclosure.

FIG. 9 is a partial cross-sectional view of an exemplary portion of the high pressure compressor 224, taken at detail view 200 of FIG. 8, according to an aspect of the present disclosure. In the FIG. 9 aspect, the high pressure compressor 224 is an axial flow compressor in which the compressed air 282 flows in a generally axial direction (in a generally longitudinal direction L with respect to the longitudinal centerline axis 212). The high pressure compressor 224 includes a compressor shroud 250 that extends circumferentially about the longitudinal centerline axis 212 (which may also therefore correspond to a centerline axis of the compressor shroud 250), and a compressor rotor shaft assembly 252. An axial compressor airflow passage 251 is defined between the compressor shroud 250 and the compressor rotor shaft assembly 252. The compressor rotor shaft assembly 252 may include, for example, multiple compressor rotors that are connected to the HP shaft 234, including a first compressor rotor 254, a second compressor rotor 256, a third compressor rotor 258, and a fourth compressor rotor 260. Of course, the compressor rotor shaft assembly 252 is not limited to four compressor rotors and fewer than four compressor rotors or more than four compressor rotors may be included instead. Each compressor rotor includes a plurality of circumferentially spaced apart rotor vanes. For example, the first compressor rotor 254 includes a plurality of circumferentially spaced apart rotor vanes 262 (one shown in FIG. 9), the second compressor rotor 256 includes a plurality of circumferentially spaced apart rotor vanes 264, the third compressor rotor 258 includes a plurality of circumferentially spaced apart rotor vanes 266 (one shown in FIG. 9), and the fourth compressor rotor 260 includes a plurality of circumferentially spaced apart rotor vanes 268 (one shown in FIG. 9). The first compressor rotor 254 may be referred to as a first rotor stage 270, the second compressor rotor 256 may be referred to as a second rotor stage 272, the third compressor rotor 258 may be referred to as a third rotor stage 274, and the fourth compressor rotor 260 may be referred to as a fourth rotor stage 284. Each of the first rotor stage 270, the second rotor stage 272, the third rotor stage 274, and the fourth rotor stage 284 progressively compress the compressed air 282 as the compressed air 282 flows axially downstream through the compressor airflow passage 251.

The high pressure compressor 224 also includes multiple stages of stator vanes that are connected to the compressor shroud 250, and extend into the compressor airflow passage 251. The multiple stages of stator vanes includes a first stator vane stage 288 that includes a plurality of stator vanes 290 (one shown in FIG. 9) that are circumferentially spaced apart about the compressor shroud 250, a second stator vane stage 292 that includes a plurality of stator vanes 294 (one shown in FIG. 9) that are circumferentially spaced apart about the compressor shroud 250, and a third stator vane stage 296 that includes a plurality of stator vanes 298 (one shown in FIG. 9) that are circumferentially spaced apart about the compressor shroud 250. The stator vanes of each of the first stator vane stage 288, the second stator vanes stage 292, and the third stator vane stage 296 are arranged to redirect the flow of the compressed air 282 exiting the compressor rotor stage that is immediately upstream of the respective stator vane stage.

While FIG. 9 depicts four compressor rotor stages and three stator vane stages, the present disclosure is not limited to four compressor rotor stages and three stator vane stages. Rather, any number of additional compressor rotor stages and corresponding stator vane stages may be arranged upstream of the first rotor stage 270, and/or downstream of the fourth rotor stage 284. For example, three additional stator vane stages and three additional rotor vane stages, arranged in alternating arrangement in a similar manner as shown in FIG. 9, may be provided upstream of the first rotor stage 270, or six additional stator vane stages and six additional rotor vane stages may be provided upstream of the first rotor stage 270.

The compressor section 221 includes a compressor bleed air system 299 at the high pressure compressor 224. The compressor bleed air system 229 includes the compressor shroud 250, that may include an inner wall 253 and an outer wall 255 that define a compressor bleed air plenum 300 therebetween. The inner wall 253, the outer wall 255, and the compressor bleed air plenum 300 may extend circumferentially about the longitudinal centerline axis 212. The compressor bleed air system 229 also includes at least one compressor bleed air passage 302 (one shown in FIG. 9) that extends through the compressor shroud 250 and provides fluid communication between the compressor airflow passage 251 and the compressor bleed air plenum 300. The compressor bleed air passage 302 may have a form similar to the compressor bleed air passage 70 shown in FIG. 2 (i.e., the compressor bleed air passage 302 may be a diffuser-type bleed air passage such as that shown in FIG. 2). However, the compressor bleed air passage 302 is not limited to the form shown in FIG. 3 and any other form may be provided instead. In the FIG. 9 aspect, the compressor bleed air passage 302 is shown as being arranged through the compressor shroud at a downstream side 305 of the first stator vane stage 288. Thus, in the example when the compressor bleed air passage 302 has the form of the compressor bleed air passage 70 of FIG. 2, the inlet 86 (FIG. 2) is arranged downstream of the downstream side 305 of the first stator vane stage 288. In operation, a portion of the compressed air 282 flowing through the compressor airflow passage 251 is routed through the at least one compressor bleed air passage 302 as a compressor bleed airflow 283 into the compressor bleed air plenum 300. A compressor bleed air offtake line 303 may provide a flow of the compressor bleed airflow 283 from the compressor bleed air plenum 300 to other parts of the engine 210 or to other aircraft systems (not shown).

Figure 10:
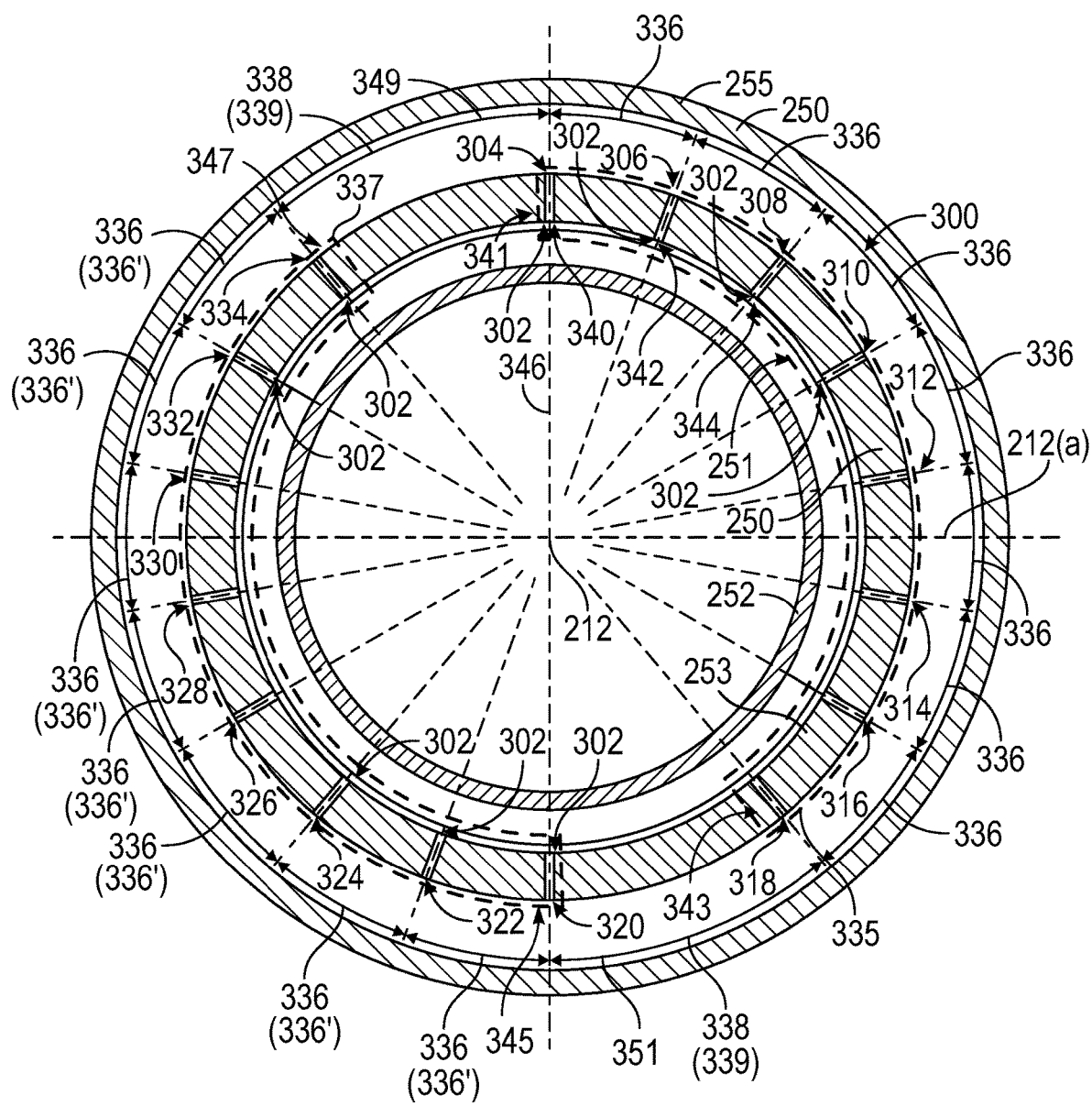
FIG. 10 is a partial cross-sectional view of a circumferential arrangement of compressor bleed air passages through the compressor shroud, taken at plane 10-10 of FIG. 9, according to an aspect of the present disclosure.

FIG. 10 is a partial cross-sectional view of a circumferential arrangement of the compressor bleed air passages 302 through the compressor shroud 250, taken at plane 10-10 of FIG. 9, according to an aspect of the present disclosure. While FIG. 9 depicts a cross-sectional view of an upper half of the high pressure compressor 224 (i.e., an upper half above a horizontal reference plane 212(*a*) through the longitudinal centerline axis 212), FIG. 10 includes an example of a lower half (i.e., a lower half of the high pressure compressor 224 below the horizontal reference plane 212(*a*) through the longitudinal centerline axis 212) of the compressor shroud 250, along with the compressor bleed air passages 302 through the lower half of the compressor shroud 250. As was discussed above, the compressor shroud 250 extends circumferentially about the longitudinal centerline axis 212, and FIG. 10 includes the full circumferential depiction of the compressor shroud 250. As shown in FIG. 10, the compressor shroud 250 includes the plurality of the compressor bleed air passages 302 therethrough that provide fluid communication between the compressor airflow passage 251 and the compressor bleed air plenum 300, such that the flow of the compressor bleed airflow 283 flows from the compressor airflow passage 251 to the compressor bleed air plenum 300. In FIG. 10, similar to the FIG. 3 aspect, sixteen compressor bleed air passages 302 are shown circumferentially spaced apart about the longitudinal centerline axis 212. However, more than sixteen compressor bleed air passages 302 or fewer than sixteen compressor bleed air passages 302 may be included instead. The sixteen compressor bleed air passages 302 include a first compressor bleed air passage 304, a second compressor bleed air passage 306, a third compressor bleed air passage 308, a fourth compressor bleed air passage 310, a fifth compressor bleed air passage 312, a sixth compressor bleed air passage 314, a seventh compressor bleed air passage 316, an eighth compressor bleed air passage 318, a ninth compressor bleed air passage 320, a tenth compressor bleed air passage 322, an eleventh compressor bleed air passage 324, a twelfth compressor bleed air passage 326, a thirteenth compressor bleed air passage 328, a fourteenth compressor bleed air passage 330, a fifteenth compressor bleed air passage 332, and a sixteenth compressor bleed air passage 334.

In the case when each of the first compressor bleed air passage 304 through the sixteenth compressor bleed air passage 334 has the configuration as shown in FIG. 2, a location of the inlet 86 of each of the compressor bleed air passage 302 is defined by the inlet center reference point 99 at the intersection of the centerline 94 and the reference line 98.

As shown in FIG. 10, each of the plurality of compressor bleed air passages 302 is circumferentially spaced apart from one another based on an angular spacing between respective ones of the inlet center reference point 99 of each of the plurality of compressor bleed air passages 302. Thus, a first inlet center reference point 340 (corresponding to the inlet center reference point 99 as shown in FIG. 2) for the first compressor bleed air passage 304 defines a circumferential location for the first compressor bleed air passage 304. Similarly, a second inlet center reference point 342 defines a circumferential location for the second compressor bleed air passage 306. The circumferential spacing between the first compressor bleed air passage 304 and the second compressor bleed air passage 306 is defined by a first angular spacing 336. Similarly, a third inlet center reference point 344 defines a circumferential location of the third compressor bleed air passage 308, and the third compressor bleed air passage 308 is angularly spaced apart from the second compressor bleed air passage 306 by the first angular spacing 336. Likewise, the angular spacing between the third compressor bleed air passage 308 and the fourth compressor bleed air passage 310 may be the first angular spacing 336, the angular spacing between the fourth compressor bleed air passage 310 and the fifth compressor bleed air passage 312 may be the first angular spacing 336. The angular spacing between the fifth compressor bleed air passage 312 and the sixth compressor bleed air passage 314 may be the first angular spacing 336, the angular spacing between the sixth compressor bleed air passage 314 and the seventh compressor bleed air passage 316 may be the first angular spacing 336, and the angular spacing between the seventh compressor bleed air passage 316 and the eighth compressor bleed air passage 318 may be the first angular spacing 336.

The same first angular spacing 336 may also be implemented between the ninth compressor bleed air passage 320 and the tenth compressor bleed air passage 322, between the tenth compressor bleed air passage 322 and the eleventh compressor bleed air passage 324, between the eleventh compressor bleed air passage 324 and the twelfth compressor bleed air passage 326, between the twelfth compressor bleed air passage 326 and the thirteenth compressor bleed air passage 328, and between the thirteenth compressor bleed air passage 328 and the fourteenth compressor bleed air passage 330. Likewise, the same first angular spacing 336 can be implemented between the fourteenth compressor bleed air passage 330 and the fifteenth compressor bleed air passage 332, and between the fifteenth compressor bleed air passage 332 and the sixteenth compressor bleed air passage 334.

On the other hand, a second angular spacing 338 is implemented between the first compressor bleed air passage 304 and the sixteenth compressor bleed air passage 334. The second angular spacing 338 may be, for example, two times greater than the first angular spacing 336. For example, when the first angular spacing 336 is twenty degrees, the second angular spacing 338 is forty degrees. The same second angular spacing 338 may also be implemented between the eighth compressor bleed air passage 318 and the ninth compressor bleed air passage 320. Of course, the second angular spacing 338 need not be two times greater than the first angular spacing 336, and any other ratio between the first angular spacing 336 and the second angular spacing 338 may be implemented, as long as that ratio is greater than 1:1. That is, the second angular spacing 338 and the first angular spacing 336 are different from one another, and, preferably, the second angular spacing 338 is greater than the first angular spacing 336.

Moreover, while FIG. 10 depicts a circumferential clocking arrangement where the first compressor bleed air passage 304 is arranged along a vertical reference plane 346, and the remaining compressor bleed air passages are arranged circumferentially with respect thereto, the circumferential clocking of the compressor bleed air passages 302 need not be as shown in FIG. 10. Rather, for example, the first compressor bleed air passage 304 may be circumferentially shifted to the position of the second compressor bleed air passage 306 instead, with each of the second compressor bleed air passage 308 through the sixteenth compressor bleed air passage 334 being shifted clockwise by the same angular amount. With the foregoing circumferential spacing of the compressor bleed air passages 302, by virtue of providing the different (greater) second angular spacing 338 between at least two consecutively spaced compressor bleed air passages 302, the non-uniform spacing of the bleed air passages 302 facilitates changing the frequency of the airflow pulses against the compressor rotor blades to reduce the vibration response induced in the compressor rotor blades.

In the FIG. 10 aspect, similar to the FIG. 3 aspect, the plurality of compressor bleed air passages 302 may also be considered as being grouped into a plurality of groups. For example, a first group 335 of the compressor bleed air passages 302 may include the first compressor bleed air passage 304 through the eighth compressor bleed air passage 318, inclusive, and a second group 337 of the compressor bleed air passages 302 may include the ninth compressor bleed air passage 320 through the sixteenth compressor bleed air passage 334, inclusive. Within the first group 335 of the compressor bleed air passages 302, each of the compressor bleed air passages 302 is spaced apart an equal circumferential spacing, such as the first angular spacing 336. Similarly, within the second group 337 of the compressor bleed air passages 302, each of the compressor bleed air passages 302 are spaced apart an equal circumferential spacing, such as the first angular spacing 336. Thus, the first angular spacing 336 may be implemented in both the first group 335 and within the second group 337. Alternatively, within the second group 337, each of the compressor bleed air passages 302 may have a different equal circumferential spacing than the equal circumferential spacing in the first group 335. For example, each of the compressor bleed air passages 302 within the second group 337 may be equally spaced apart with a first angular spacing 336' that is different from the first angular spacing 336 within the first group 335.

On the other hand, the first group 335 and the second group 337 are spaced apart from each other with an angular spacing that is greater than the first angular spacing 336. For example, the first group 335 and the second group 337 may be spaced apart by a second angular spacing 339, which may be the same as the second angular spacing 338. That is, for example, in the first group 335, the first compressor bleed air passage 304 may be considered to be at a first end 341 of the first group 335, and the eighth compressor bleed air passage 318 may be considered to be at a second end 343 of the first group 335. The ninth compressor bleed air passage 320 may be considered to be at a first end 345 of the second group 337, and the sixteenth compressor bleed air passage 334 may be at a second end 347 of the second group 337. The second angular spacing 339 between the first group 335 and the second group 337 is, for example, an angular spacing between the first end 341 of the first group 335 and the second end 347 of the second group 337 (i.e., the same as the second angular spacing 338 between the sixteenth compressor bleed air passage 334 and the first compressor bleed air passage 304), and an angular spacing between the second end 343 of the first group 335 and the first end 345 of the second group 337 (i.e., the same as the second angular spacing 338 between the eighth compressor bleed air passage 318 and the ninth compressor bleed air passage 320). In this case, the first group 335 and the second group 337 are considered to be a mirror image of one another in the FIG. 10 cross-sectional view, with equal first angular spacing 336 between the compressor bleed air passages 302 within each group, and with equal second angular spacing 339 between the first group 335 and the second group 337.

Alternatively, rather than adjacent ends of the first group 335 and the second group 337 being equally spaced apart by the second angular spacing 339, different angular spacings may be implemented between adjacent ends of the first group 335 and the second group 337. For example a second angular spacing 349 may be implemented between the first end 341 of the first group 335 and the second end 347 of the second group 337, where the second angular spacing 349 may be greater than the second angular spacing 339, and a third angular spacing 351 may be implemented between the second end 343 of the first group 335 and the first end 345 of the second group 337, where the third angular spacing 351 is less than the second angular spacing 349 and is also less than the second angular spacing 338, but is greater than first angular spacing 336. In this case, the second group 337 may be shifted counterclockwise about the longitudinal centerline axis 12 from the location shown in FIG. 10 to provide a greater second angular spacing 349 than the second angular spacing 339, and to provide a lesser third angular spacing 351 than the second angular spacing 339. With the foregoing first angular spacing 336 of the compressor bleed air passages 302 in each group, and the second angular spacing 338, the second angular spacing 339, the second angular spacing 349, or the third angular spacing 351, each of which is greater than the first angular spacing 336, between each group, the non-uniform spacing of the bleed air passages 302 facilitates changing the frequency of the airflow pulses against the compressor rotor blades to reduce the vibration response induced in the compressor rotor blades. Of course, the present disclosure is not limited to two groups (i.e., the first group 335 and the second group 337) of compressor bleed air passages 302, and more than two groups could be implemented instead, as long as the angular spacing between adjacent groups is different from the angular spacing between respective ones of the compressor bleed air passages 302 within the respective groups.

Figure 11:
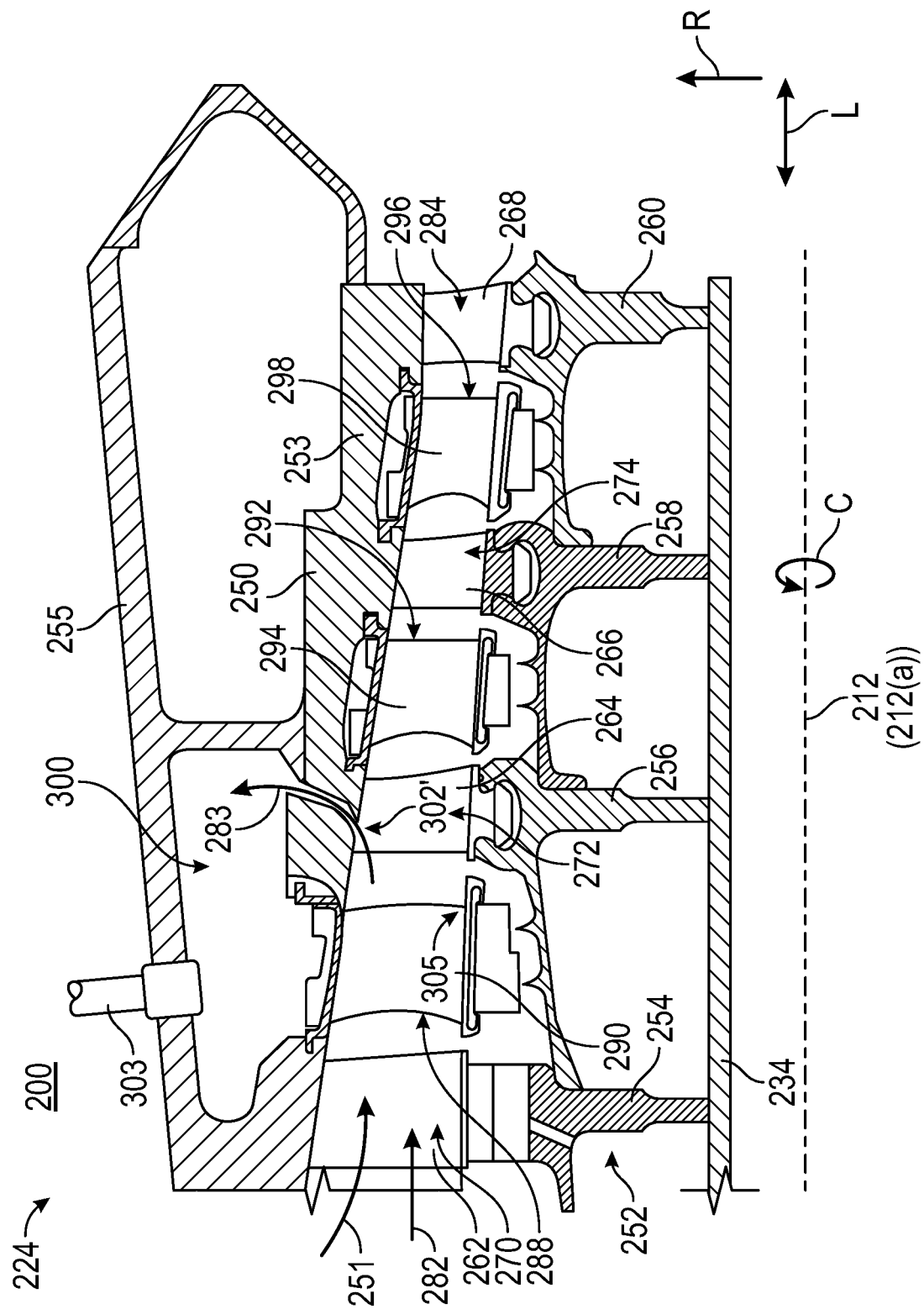
FIG. 11 is a cross-sectional view of an alternate high pressure compressor to that shown in FIG. 9, according to another aspect of the present disclosure.

FIG. 11 is a cross-sectional view of an alternate high pressure compressor to that shown in FIG. 9, according to another aspect of the present disclosure. In FIG. 11, elements that are the same as the elements shown in FIG. 9 are labeled with the same reference numerals and the description of those elements is the same as described above for FIG. 9. One difference, however, between the FIG. 9 aspect and the FIG. 11 aspect is that, in the FIG. 11 aspect, a plurality of compressor bleed air passages 302' are shifted axially aft from the axial location of the compressor bleed air passages 302 of the FIG. 9 aspect. As described above, in the FIG. 9 aspect, the plurality of compressor bleed air passages 302 are axially located at the downstream side 305 of the first stator vane stage 288. On the other hand, in the FIG. 11 aspect, the plurality of compressor bleed air passages 302' are arranged axially (i.e., in the longitudinal direction L) aligned with the second rotor stage 272 (e.g., over the rotor blades of the compressor rotor). In the FIG. 11 aspect, the circumferential clocking and angular spacing between the plurality of compressor bleed air passages 302' is the same as that shown in FIG. 10 for the FIG. 9 aspect. Accordingly, the description of FIG. 10 is equally applicable to the circumferential spacing of the plurality of compressor bleed air passages 302' for the FIG. 11 aspect.

Figure 12:
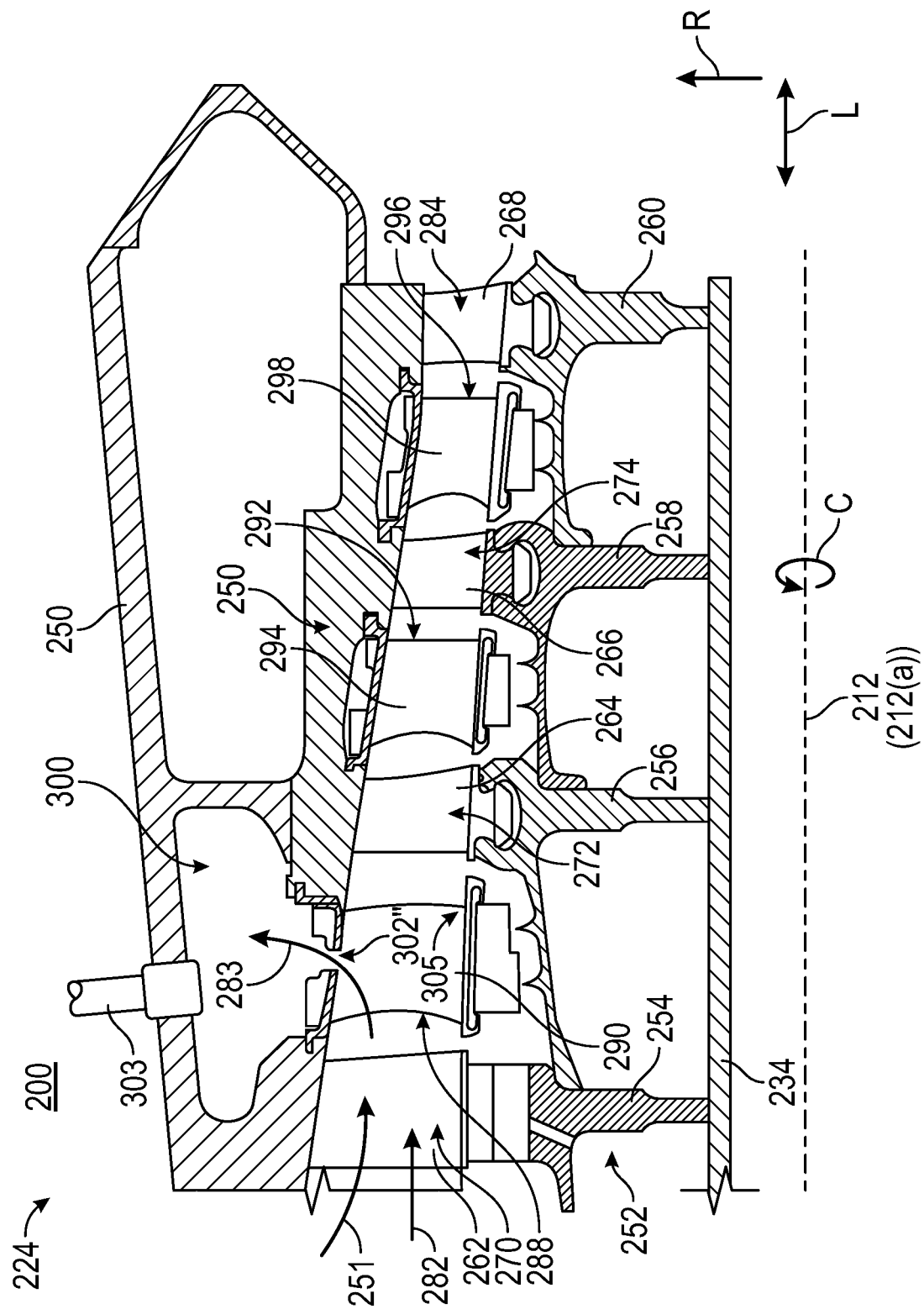
FIG. 12 is a cross-sectional view of another alternate high pressure compressor to that shown in FIG. 9, according to another aspect of the present disclosure

FIG. 12 is a cross-sectional view of an alternate high pressure compressor to that shown in FIG. 9, according to still another aspect of the present disclosure. In FIG. 12, elements that are the same as the elements shown in FIG. 9 are labeled with the same reference numerals and the description of those elements is the same as described above for FIG. 9. One difference, however, between the FIG. 9 aspect and the FIG. 12 aspect is that, in the FIG. 12 aspect, a plurality of compressor bleed air passages 302" are shifted axially forward from the axial location of the compressor bleed air passages 302 of the FIG. 9 aspect. As described above, in the FIG. 9 aspect, the plurality of compressor bleed air passages 302 are axially located at the downstream side 305 of the first stator vane stage 288. On the other hand, in the FIG. 12 aspect, the plurality of compressor bleed air passages 302" are arranged through a base of the stator vanes 290, or circumferentially between respective ones of the stator vanes 290, to provide the flow of the compressor bleed airflow 283 therethrough into the compressor bleed air plenum 300. In the FIG. 12 aspect, the circumferential clocking and angular spacing between the plurality of compressor bleed air passages 302" may be the same as that shown in FIG. 10 for the FIG. 9 aspect. Accordingly, the description of FIG. 10 is equally applicable to the circumferential spacing of the plurality of compressor bleed air passages 302" for the FIG. 12 aspect.

The compressor bleed air systems described herein implements non-uniform compressor bleed air passage spacing to reduce the stimulus on compressor rotors upstream and downstream of the compressor bleed air passages. The use of non-uniform compressor bleed air passage spacing changes the forcing function around the compressor rotor. This can be achieved through numerous asymmetric patterns, including but not limited to, split case spacing (right half/left half) differences, one big gap at a particular clockwise position, multi-segment non-uniform spacing, or any other combination (especially on additively manufactured parts). This solution avoids the need to re-design rotating parts to be more robust to stimuli by adding weight or other performance impacting features to meet life requirements.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

Further aspects of the present disclosure are provided by the subject matter of the following clauses.

A gas turbine engine including a compressor, and a compressor bleed air system, including, a compressor shroud defining a compressor airflow passage therewithin, a compressor bleed air plenum, and a plurality of compressor bleed air passages arranged through the compressor shroud and providing fluid communication between the compressor airflow passage and the compressor bleed air plenum, each of the plurality of compressor bleed air passages including an inlet at the compressor airflow passage and an outlet at the compressor bleed air plenum, wherein respective inlets of respective ones of the plurality of compressor bleed air passages are arranged circumferentially spaced apart from one another about a centerline axis of the compressor shroud, a first compressor bleed air passage of the plurality of compressor bleed air passages and a second compressor bleed air passage of the plurality of compressor bleed air passages are arranged circumferentially adjacent to one another and an inlet of the first compressor bleed air passage and an inlet of the second compressor bleed air passage are circumferentially spaced apart from one another by a first angular spacing, and respective inlets of at least a portion of a remainder of the plurality of compressor bleed air passages circumferentially sequentially arranged adjacent to each other are circumferentially spaced apart from one another by a second angular spacing, the second angular spacing being less than the first angular spacing.

The gas turbine engine according to the preceding clause, wherein at least one of the plurality of compressor bleed air passages defines a constant width throat at the inlet, and defines a diverging portion from a downstream end of the throat to the outlet.

The gas turbine engine according to any preceding clause, wherein the compressor airflow passage defines a centrifugal compressor airflow passage, and the plurality of compressor bleed air passages are arranged to receive a bleed airflow from an outer edge of impeller blades of an impeller that rotates within the centrifugal compressor airflow passage.

The gas turbine engine according to according to any preceding clause, wherein the compressor airflow passage defines an axial compressor airflow passage, the compressor shroud includes a plurality of stator vanes arranged circumferentially in a stage about the compressor shroud, and the plurality of compressor bleed air passages are arranged on a downstream side of the plurality of stator vanes.

The gas turbine engine according to according to any preceding clause, wherein the respective inlets of the portion of the remainder of the plurality of compressor bleed air passages are circumferentially spaced apart from one another by an equal angular spacing.

The gas turbine engine according to according to any preceding clause, wherein the respective inlets of the portion of the remainder of the plurality of compressor bleed air passages are arranged circumferentially between the first compressor bleed air passage and the second compressor bleed air passage.

The gas turbine engine according to according to any preceding clause, wherein the inlet of a first one of the portion of the remainder of the plurality of compressor bleed air passages is arranged adjacent to the first compressor bleed air passage and is arranged the second angular spacing from the inlet of the first compressor bleed air passage, and the inlet of a second one of the portion of the remainder of the plurality of compressor bleed air passages is arranged adjacent to the second compressor bleed air passage and is arranged the second angular spacing from the inlet of the second compressor bleed air passage.

The gas turbine engine according to according to any preceding clause, wherein at least one of the plurality of compressor bleed air passages defines a diffuser flow passage in which a size of the diffuser flow passage increases from the inlet to the outlet.

The gas turbine engine according to according to any preceding clause, wherein the inlet and the outlet are circular openings.

The gas turbine engine according to according to any preceding clause, wherein the diffuser flow passage defines a centerline extending from a center of the inlet to a center of the outlet.

The gas turbine engine according to according to any preceding clause, wherein the centerline is curvilinear extending from the center of the inlet to the center of the outlet.

The gas turbine engine according to according to any preceding clause, wherein the compressor shroud includes an annular slot compressor bleed air passage therethrough, and a plurality of vanes are arranged within the annular slot compressor bleed air passage, the plurality of compressor bleed air passages being defined between respective ones of the plurality of vanes.

The gas turbine engine according to according to any preceding clause, wherein each of the plurality vanes extend axially across the annular slot compressor bleed air passage from a forward sidewall of the annular slot compressor bleed air passage to an aft sidewall of annular slot compressor bleed air passage.

A gas turbine engine including a compressor, and a compressor bleed air system including, a compressor shroud defining a compressor airflow passage therewithin, a compressor bleed air plenum, and a plurality of compressor bleed air passages arranged through the compressor shroud and providing fluid communication between the compressor airflow passage and the compressor bleed air plenum, each of the plurality of compressor bleed air passages including an inlet at the compressor airflow passage and an outlet at the compressor bleed air plenum, wherein (a) the plurality of compressor bleed air passages are arranged in a first group of the plurality of the compressor bleed air passages and a second group of the plurality of the compressor bleed air passages, (b) respective inlets of respective ones of each of the plurality of compressor bleed air passages in the first group and respective inlets of respective ones of each of the plurality of compressor bleed air passages in the second group are arranged equally spaced apart a first angular spacing from one another about a centerline axis of the compressor shroud, and (c) a first end of the first group and a second end of the second group are arranged spaced apart from one another a second angular spacing greater than the first angular spacing.

The gas turbine engine according to according to the preceding clause, wherein the compressor airflow passage defines a centrifugal compressor airflow passage, and the plurality of compressor bleed air passages are arranged to receive a bleed airflow from an outer edge of impeller blades of an impeller that rotates within the centrifugal compressor airflow passage.

The gas turbine engine according to according to any preceding clause, wherein the compressor airflow passage defines an axial compressor airflow passage, the compressor shroud includes a plurality of compressor stator vanes arranged circumferentially in a stage about the compressor shroud, and the plurality of compressor bleed air passages are arranged on a downstream side of the plurality of compressor stator vanes.

The gas turbine engine according to according to any preceding clause, wherein at least one of the plurality of compressor bleed air passages defines a diffuser flow passage in which a size of the diffuser flow passage increases extending from the inlet to the outlet.

The gas turbine engine according to according to any preceding clause, wherein a second end of the first group and a first end of the second group are arranged spaced apart from one another a third angular spacing greater than the first angular spacing.

The gas turbine engine according to according to any preceding clause, wherein the second angular spacing is the same as the third angular spacing.

The gas turbine engine according to according to any preceding clause, wherein the second angular spacing is different from the third angular spacing.

We claim:

1. A gas turbine engine comprising:
a compressor; and
a compressor bleed air system including:
a compressor shroud defining a compressor airflow passage therewithin;
a compressor bleed air plenum;
a plurality of compressor stator vanes connected with the compressor shroud and extending into the compressor airflow passage, the plurality of compressor stator vanes being arranged circumferentially spaced apart from each other within a stator vane stage of the compressor; and
a plurality of compressor bleed air passages arranged through the compressor shroud within the stator vane stage and providing fluid communication between the compressor airflow passage and the compressor bleed air plenum, each of the plurality of compressor bleed air passages including an inlet at the compressor airflow passage and an outlet at the compressor bleed air plenum,
wherein respective inlets of respective ones of the plurality of compressor bleed air passages are arranged circumferentially spaced apart from one another about a centerline axis of the compressor shroud, a first compressor bleed air passage of the plurality of compressor bleed air passages and a second compressor bleed air passage of the plurality of compressor bleed air passages are arranged circumferentially adjacent to one another and an inlet of the first compressor bleed air passage and an inlet of the second compressor bleed air passage are circumferentially spaced apart from one another by a first angular spacing, and respective inlets of at least a portion of a remainder of the plurality of compressor bleed air passages circumferentially sequentially arranged adjacent to each other are circumferentially spaced apart from one another by a second angular spacing, the second angular spacing being less than the first angular spacing,
wherein each one of the plurality of compressor stator vanes includes a leading edge and a trailing edge extending along an axial direction along the centerline axis, and a base connecting the compressor stator vane to the compressor shroud, the stator vane stage being defined axially between the leading edge and the trailing edge, and
wherein each one of the plurality of compressor bleed air passages is arranged circumferentially within the stator vane stage between a respective pair of compressor stator vanes among the plurality of compressor stator vanes.

2. The gas turbine engine according to claim 1, wherein at least one of the plurality of compressor bleed air passages defines a constant width throat at the inlet, and defines a diverging portion from a downstream end of the throat to the outlet.

3. The gas turbine engine according to claim 1, wherein the respective inlets of the portion of the remainder of the plurality of compressor bleed air passages are circumferentially spaced apart from one another by an equal angular spacing.

4. The gas turbine engine according to claim 3, wherein the respective inlets of the portion of the remainder of the plurality of compressor bleed air passages are arranged circumferentially between the first compressor bleed air passage and the second compressor bleed air passage.

5. The gas turbine engine according to claim 4, wherein the inlet of a first one of the portion of the remainder of the plurality of compressor bleed air passages is arranged adjacent to the first compressor bleed air passage and is arranged the second angular spacing from the inlet of the first compressor bleed air passage, and the inlet of a second one of the portion of the remainder of the plurality of compressor bleed air passages is arranged adjacent to the second compressor bleed air passage and is arranged the second angular spacing from the inlet of the second compressor bleed air passage.

6. The gas turbine engine according to claim 1, wherein at least one of the plurality of compressor bleed air passages defines a diffuser flow passage in which a size of the diffuser flow passage increases from the inlet to the outlet.

7. The gas turbine engine according to claim 6, wherein the inlet and the outlet are circular openings.

8. The gas turbine engine according to claim 7, wherein the diffuser flow passage defines a centerline extending from a center of the inlet to a center of the outlet.

9. The gas turbine engine according to claim 8, wherein the centerline is curvilinear extending from the center of the inlet to the center of the outlet.

10. A gas turbine engine comprising:
a compressor; and
a compressor bleed air system including:
a compressor shroud defining a compressor airflow passage therewithin;
a compressor bleed air plenum;

a plurality of compressor stator vanes connected with the compressor shroud and extending into the compressor airflow passage, the plurality of compressor stator vanes being arranged circumferentially spaced apart from each other within a stator vane stage of the compressor; and a plurality of compressor bleed air passages arranged through the compressor shroud within the stator vane stage and providing fluid communication between the compressor airflow passage and the compressor bleed air plenum, each of the plurality of compressor bleed air passages including an inlet at the compressor airflow passage and an outlet at the compressor bleed air plenum, wherein (a) the plurality of compressor bleed air passages are arranged in a first group of the plurality of the compressor bleed air passages and a second group of the plurality of the compressor bleed air passages, (b) respective inlets of respective ones of each of the plurality of compressor bleed air passages in the first group and respective inlets of respective ones of each of the plurality of compressor bleed air passages in the second group are arranged equally spaced apart a first angular spacing from one another about a centerline axis of the compressor shroud, and (c) a first end of the first group and a second end of the second group are arranged spaced apart from one another a second angular spacing greater than the first angular spacing, wherein each one of the plurality of compressor stator vanes includes a leading edge and a trailing edge extending along an axial direction along the centerline axis, and a base connecting the compressor stator vane to the compressor shroud, the stator vane stage being defined axially between the leading edge and the trailing edge, and wherein each one of the plurality of compressor bleed air passages is arranged circumferentially within the stator vane stage between a respective pair of compressor stator vanes among the plurality of compressor stator vanes.

11. The gas turbine engine according to claim 10, wherein a second end of the first group and a first end of the second group are arranged spaced apart from one another a third angular spacing greater than the first angular spacing.

12. The gas turbine engine according to claim 11, wherein the second angular spacing is the same as the third angular spacing.

13. The gas turbine engine according to claim 11, wherein the second angular spacing is different from the third angular spacing.

14. The gas turbine engine according to claim 10, wherein at least one of the plurality of compressor bleed air passages defines a constant width throat at the inlet, and defines a diverging portion from a downstream end of the throat to the outlet.

15. The gas turbine engine according to claim 10, wherein at least one of the plurality of compressor bleed air passages defines a diffuser flow passage in which a size of the diffuser flow passage increases from the inlet to the outlet.

16. The gas turbine engine according to claim 15, wherein the inlet and the outlet are circular openings.

17. The gas turbine engine according to claim 16, wherein the diffuser flow passage defines a centerline extending from a center of the inlet to a center of the outlet.

18. The gas turbine engine according to claim 17, wherein the centerline is curvilinear extending from the center of the inlet to the center of the outlet.

* * * * *